US012711904B2

(12) United States Patent
Jeong et al.

(10) Patent No.: US 12,711,904 B2
(45) Date of Patent: Aug. 18, 2026

(54) STAGE CIRCUIT OF GATE DRIVER AND DISPLAY DEVICE INCLUDING THE SAME

(71) Applicant: Samsung Display Co., LTD., Yongin-si (KR)

(72) Inventors: Keuk-Jin Jeong, Yongin-si (KR); Wongyun Kim, Yongin-si (KR); Min Kang, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 18/965,029

(22) Filed: Dec. 2, 2024

(65) Prior Publication Data

US 2025/0279037 A1 Sep. 4, 2025

(30) Foreign Application Priority Data

Feb. 29, 2024 (KR) ........................ 10-2024-0029677

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2300/0861* (2013.01); *G09G 2310/0267* (2013.01); *G09G 2310/0286* (2013.01); *G09G 2310/08* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/3258; G09G 3/3266; G09G 3/3275; G09G 3/3283; G09G 3/3291
USPC ...................................................... 345/76–83
See application file for complete search history.

(56) References Cited

U.S. PATENT DOCUMENTS

| | | | | |
|---|---|---|---|---|
| 12,579,931 B2 * | 3/2026 | Jeong | ........................ | G09G 3/32 |
| 2008/0062071 A1 * | 3/2008 | Jeong | .................... | G11C 19/184 377/64 |
| 2008/0219401 A1 * | 9/2008 | Tobita | .................... | G11C 19/28 377/79 |

(Continued)

FOREIGN PATENT DOCUMENTS

KR 1020220095921 A 7/2022

*Primary Examiner* — Ke Xiao
*Assistant Examiner* — Nelson Lam
(74) *Attorney, Agent, or Firm* — CANTOR COLBURN LLP

(57) ABSTRACT

A stage circuit included in a gate driver of a display device, includes: a first transistor connected between an input terminal receiving an input signal and a control terminal, and including a gate electrode connected to a first clock terminal receiving a first clock signal: a second transistor connected between a line supplying a gate high voltage and an output terminal generating an output signal, and including a gate electrode connected to an inversion control terminal; a third transistor connected between the output terminal and a second clock terminal receiving a second clock signal, and including a gate electrode connected to the control terminal; a first capacitor connected between the control terminal and the output terminal; and a control circuit configured to controlling an inversion control voltage of the inversion control terminal based on a control voltage of the control terminal.

17 Claims, 20 Drawing Sheets

(56) References Cited

U.S. PATENT DOCUMENTS

| | | | | |
|---|---|---|---|---|
| 2012/0013588 | A1* | 1/2012 | Chung | G09G 3/3266 345/204 |
| 2012/0139962 | A1* | 6/2012 | Chung | G11C 19/184 345/690 |
| 2014/0064438 | A1* | 3/2014 | Wu | G09G 3/3225 377/64 |
| 2015/0043703 | A1* | 2/2015 | Tan | G11C 19/184 377/68 |
| 2016/0071614 | A1* | 3/2016 | Lee | G09G 3/3677 377/67 |
| 2019/0304374 | A1* | 10/2019 | Wang | G09G 3/3266 |
| 2019/0318693 | A1* | 10/2019 | Jung | G09G 3/3266 |
| 2021/0304659 | A1* | 9/2021 | Qing | G09G 3/3266 |

* cited by examiner

FIG. 9

| | P1 | P2 | P3 | P4 | P5 |
|---|---|---|---|---|---|
| SIN | L | H | H | H | H |
| CLK1 | L | H | H | H | L |
| CLK2 | H | H | L | H | H |
| T1 | ON | OFF | OFF | OFF | ON |
| T2 | OFF | OFF | OFF | OFF | ON |
| T3 | ON | ON | ON | ON | OFF |
| T4 | ON | ON | ON | ON | OFF |

FIG. 12

| | P1 | P2 | P3 | P4 | P5 |
|---|---|---|---|---|---|
| SIN | L | H | H | H | H |
| CLK1 | L | H | H | H | L |
| CLK2 | H | H | L | H | H |
| T1 | ON | OFF | OFF | OFF | ON |
| T2 | OFF | OFF | OFF | OFF | ON |
| T3 | ON | ON | ON | ON | OFF |
| T4 | ON | ON | ON | ON | OFF |
| TN | OFF | OFF | OFF | OFF | ON |

FIG. 14

| | P1 | P2 | P3 | P4 | P5 |
|---|---|---|---|---|---|
| SIN | L | H | H | H | H |
| CLK1 | L | H | H | H | L |
| CLK2 | H | H | L | H | H |
| T1 | ON | OFF | OFF | OFF | ON |
| T2 | ON | ON | OFF | ON | ON |
| T3 | ON | ON | ON | ON | OFF |
| T4 | OFF | OFF | ON | OFF | OFF |
| TN | OFF | OFF | OFF | OFF | ON |

FIG. 16

| | P1 | P2 | P3 | P4 | P5 |
|---|---|---|---|---|---|
| SIN | L | H | H | H | H |
| CLK1 | L | H | H | H | L |
| CLK2 | H | H | L | H | H |
| T1 | ON | OFF | OFF | OFF | ON |
| T2 | ON | OFF | OFF | OFF | ON |
| T3 | ON | ON | ON | ON | OFF |
| T4 | ON | ON | ON | ON | OFF |
| TN | OFF | OFF | OFF | OFF | ON |

STAGE CIRCUIT OF GATE DRIVER AND DISPLAY DEVICE INCLUDING THE SAME

This application claims priority to Korean Patent Application No. 10-2024-0029677, filed on Feb. 29, 2024, and all the benefits accruing therefrom under 35 U.S.C. § 119, the content of which in its entirety is herein incorporated by reference.

BACKGROUND

1. Technical Field

Example embodiments relate generally to diving of a display device, and more particularly to a stage circuit of a gate driver and a display device including the stage circuit.

2. Discussion of the Related Art

A display device includes a display panel and a display panel driver. The display panel may include a plurality of gate lines, a plurality of data lines, a plurality of emission lines and a plurality of pixels. The display panel driver includes a gate driver providing gate signals to the gate lines, a data driver providing data voltages to the data lines, an emission driver providing emission signals to the emission lines, and a drive controller controlling the gate driver, the data driver and the emission driver. The drivers (e.g., the gate driver and/or the emission driver) of the display device may provide signals (e.g., gate signals and/or emission signals) to the pixels of the display panel in a row-by-row sequence. To provide the signals sequentially on a row-by-row basis, the driver may be implemented in the form of a shift register including a plurality of stage circuits.

In general, each stage circuit of the driver may include primarily only a single type of transistor, for example, a p-type metal oxide semiconductor ("PMOS") transistor. When each stage circuit includes only the PMOS transistors, in order to output an output signal with a low voltage level, a bootstrapping operation is performed to reduce the voltage of the internal nodes of the stage circuit to a voltage level lower than the low voltage level of the output signal. The display device includes a large number of stage circuits, and there is a problem that the dead space of the display panel increases significantly as the size of each stage circuit increases.

SUMMARY

Some example embodiments may provide a stage circuit of a gate driver having a reduced size.

Some example embodiments may provide a display device having a reduced dead space, using the stage circuits.

According to example embodiments, a stage circuit included in a gate driver of a display device, includes: a first transistor, a second transistor, a third transistor, a first capacitor and a control circuit. The first transistor is connected between an input terminal receiving an input signal and a control terminal, and the first transistor includes a gate electrode connected to a first clock terminal receiving a first clock signal. The second transistor is connected between a line supplying a gate high voltage and an output terminal generating an output signal, and the second transistor includes a gate electrode connected to an inversion control terminal. The third transistor is connected between the output terminal and a second clock terminal receiving a second clock signal, and the third transistor includes a gate electrode connected to the control terminal. The first capacitor is connected between the control terminal and the output terminal. The control circuit controls an inversion control voltage of the inversion control terminal based on a control voltage of the control terminal.

In some example embodiments, the first clock signal and the second clock signal may have the same clock cycle, have a phase difference of 180 degrees from each other, and are at a logic low level for ¼ of the clock cycle. A horizontal time allocated to drive one row of the display device may be ½ of the clock cycle.

In some example embodiments, the first transistor, the second transistor, and the third transistor may be P-type metal oxide semiconductor (PMOS) transistors.

In some example embodiments, in a first operation period, the first clock signal and the input signal may be at a logic low level, the second clock signal is at a logic high level, and the control voltage may be at the logic low level. In a second operation period after the first operation period, the first clock signal, the second clock signal and the input signal may be at the logic high level, and the control voltage may maintain the logic low level. In a third operation period after the second operation period, the second clock signal may be at the logic low level, the first clock signal and the input signal may be at the logic high level, and the control voltage may be boosted to a boosting level lower than the logic low level. In a fourth operation period after the third operation period, the first clock signal, the second clock signal and the input signal may be at the logic high level, and the control voltage may be restored to the logic low level from the boosting level. In a fifth operation period after the fourth operation period, the first clock signal may be at the logic low level, the input signal and the second clock signal may be at the logic high level, and the control voltage may be at the logic high level.

In some example embodiments, the output signal may be at the logic low level in the third operation period, and the output signal may be at the logic high level in the first operation period, the second operation period, the fourth operation period and the fifth operation period.

In some example embodiments, the inversion control voltage may be at the logic low level in the fifth operation period, and the inversion control voltage may be at the logic high level in the first operation period, the second operation period, the third operation period and the fourth operation period.

In some example embodiments, the control circuit may include a fourth transistor and a second capacitor. The fourth transistor may be connected between the line supplying the gate high voltage and the inversion control terminal, and the fourth transistor may include a gate electrode connected to the control terminal. The second capacitor may be connected between the first clock terminal and the inversion control terminal.

In some example embodiments, the first transistor, the second transistor, the third transistor and the fourth transistor may be PMOS transistors.

In some example embodiments, the control circuit may include a fourth transistor, an enhancement transistor and a second capacitor. The fourth transistor may be connected between the line supplying the gate high voltage and the inversion control terminal, and the fourth transistor may include a gate electrode connected to the control terminal. The enhancement transistor may be connected between a line supplying a gate low voltage and the inversion control terminal, and the enhancement transistor may include a gate electrode connected to the control terminal. The second capacitor may be connected between the line supplying the gate high voltage and the inversion control terminal. The first transistor, the second transistor, the third transistor and the fourth transistor may be PMOS transistors, and the enhancement transistor may be an N-type metal oxide semiconductor ("NMOS") transistor.

In some example embodiments, the control circuit may include a fourth transistor, an enhancement transistor and a second capacitor. The fourth transistor may be connected between the line supplying the gate high voltage and the inversion control terminal, and the fourth transistor may include a gate electrode connected to the second clock terminal. The enhancement transistor may be connected between a line supplying a gate low voltage and the inversion control terminal, and the enhancement transistor may include a gate electrode connected to the control terminal. The second capacitor may be connected between the line supplying the gate high voltage and the inversion control terminal. The first transistor, the second transistor, the third transistor and the fourth transistor may be PMOS transistors, and the enhancement transistor may be an NMOS transistor.

In some example embodiments, the control circuit may include a fourth transistor and an enhancement transistor. The fourth transistor may be connected between the first clock terminal and the inversion control terminal, and the fourth transistor may include a gate electrode connected to the control terminal. The enhancement transistor may be connected between a line supplying a gate low voltage and the inversion control terminal, and the enhancement transistor may include a gate electrode connected to the control terminal. The first transistor, the second transistor, the third transistor and the fourth transistor may be PMOS transistors, and the enhancement transistor may be an NMOS transistor.

In some example embodiments, the stage circuit may further include a load-reduction transistor connected in series with the first transistor between the input terminal and the control terminal, and the load-reduction transistor includes a gate electrode receiving a gate low voltage.

In some example embodiments, the control circuit may include one transistor and one capacitor.

In some example embodiments, the control circuit may include two transistors.

According to example embodiments, a stage circuit included in a gate driver of a display device, includes: a first P-type metal oxide semiconductor (PMOS) transistor connected between an input terminal receiving an input signal and a control terminal, the first PMOS transistor including a gate electrode connected to a first clock terminal receiving a first clock signal, a second PMOS transistor connected between a line supplying a gate high voltage and an output terminal generating an output signal, the second PMOS transistor including a gate electrode connected to an inversion control terminal. a third PMOS transistor connected between the output terminal and a second clock terminal receiving a second clock signal, the third PMOS transistor including a gate electrode connected to the control terminal, a fourth PMOS transistor connected between the line supplying the gate high voltage and the inversion control terminal, the fourth PMOS transistor including a gate electrode connected to the control terminal, a first capacitor connected between the control terminal and the output terminal, and a second capacitor connected between the first clock terminal and the inversion control terminal.

According to example embodiments, a display device includes: a display panel including a pixel, a gate driver configured to output a gate signal to the pixel, a data driver configured to output a data voltage to the pixel, and an emission driver configured to output an emission signal to the pixel. The gate driver includes at least one stage circuit. The stage circuit includes a first transistor connected between an input terminal receiving an input signal and a control terminal, the first transistor including a gate electrode connected to a first clock terminal receiving a first clock signal, a second transistor connected between a line supplying a gate high voltage and an output terminal generating an output signal, the second transistor including a gate electrode connected to an inversion control terminal, a third transistor connected between the output terminal and a second clock terminal receiving a second clock signal, the third transistor including a gate electrode connected to the control terminal, a first capacitor connected between the control terminal and the output terminal, and a control circuit configured to control an inversion control voltage of the inversion control terminal based on a control voltage of the control terminal.

The stage circuit according to example embodiments may be implemented with fewer transistors, thereby reducing the size of the gate driver including the stage circuits and reducing the dead space in the display panel without sacrificing performance of the gate driver.

In addition, the stage circuit according to example embodiments may utilize boosting via capacitors to improve the waveform of the output signal, thereby enhancing the performance of the display device including the stage circuits.

Further, the stage circuit according to example embodiments may remove unnecessary operation of the display device and reduce wiring routing in the display device by using fewer transistors and capacitors, thereby improving the design margin of the display device.

BRIEF DESCRIPTION OF THE DRAWINGS

Example embodiments will be more clearly understood from the following detailed description taken in conjunction with the accompanying drawings.

FIG. 9 is a diagram illustrating logic levels of signals and operations of transistors according to operation periods of the stage circuit of FIG. 8.

FIG. 12 is a diagram illustrating logic levels of signals and operations of transistors according to operation periods of the stage circuit of FIG. 11.

FIG. 14 is a diagram illustrating logic levels of signals and operations of transistors according to operation periods of the stage circuit of FIG. 13.

FIG. 16 is a diagram illustrating logic levels of signals and operations of transistors according to operation periods of the stage circuit of FIG. 15.

DETAILED DESCRIPTION

Figure 1:
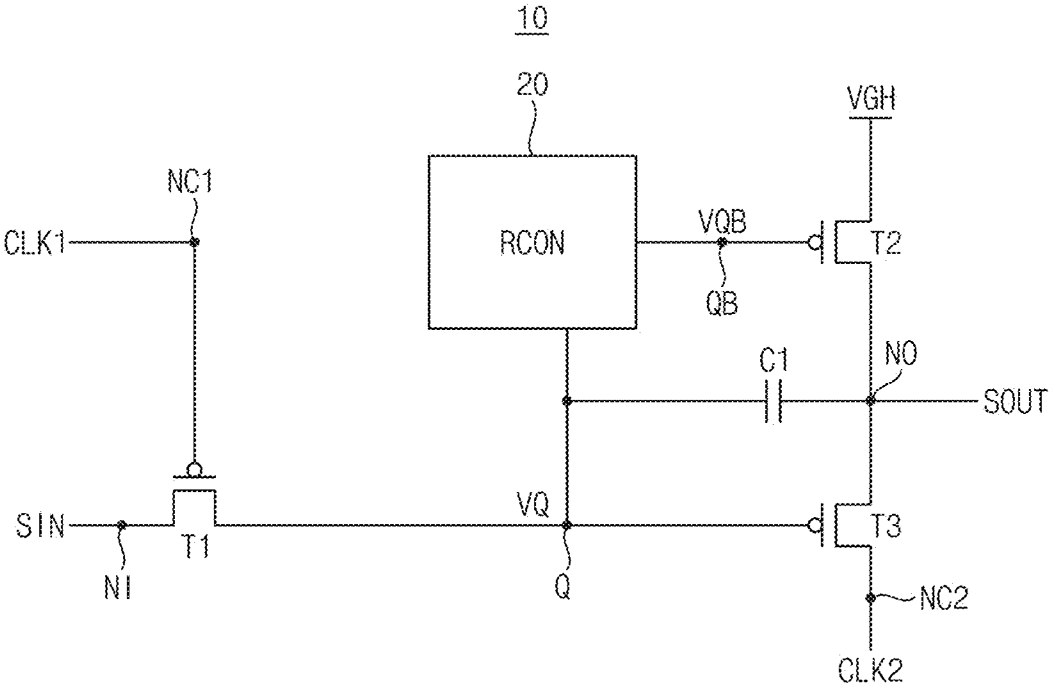
FIG. 1 is a diagram illustrating a stage circuit according to example embodiments.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Various example embodiments will be described more fully hereinafter with reference to the accompanying drawings, in which some example embodiments are shown. In the drawings, like numerals refer to like elements throughout. The repeated descriptions may be omitted.

FIG. 1 is a diagram illustrating a stage circuit according to example embodiments. The stage circuit of FIG. 1 may be included in a gate driver of a display device.

Referring to FIG. 1, a stage circuit 10 includes a first transistor T1, a second transistor T2, a third transistor T3, a first capacitor C1, and a control circuit ("RCON") 20.

The first transistor T1 is connected between an input terminal NI receiving an input signal SIN, and a control terminal Q, and the first transistor T1 includes a gate electrode connected to a first clock terminal NC1 receiving a first clock signal CLK1.

The second transistor T2 is connected between a line supplying a gate high voltage VGH and an output terminal NO generating an output signal SOUT, and the second transistor T2 includes a gate electrode connected to an inversion control terminal QB.

The third transistor T3 is connected between the output terminal NO and the second clock terminal NC2 receiving a second clock signal CLK2, and the third transistor T3 includes a gate electrode connected to a control terminal Q.

The first capacitor C1 is connected between the control terminal Q and the output terminal NO.

The control circuit 20 may control an inversion control voltage VQB of the inversion control terminal QB based on at least a control voltage VQ of the control terminal Q. According to example embodiments, the control circuit 20 may further receive the gate high voltage VGH, the gate low voltage VGL, the first clock signal CLK1 and/or the second clock signal CLK2 (See FIGS. 8, 11, 13, 15, and 17-20), in addition to the control voltage VQ, and control the inversion control voltage VQB of the inversion control terminal QB based on the received voltages and signals.

In an example embodiment, as shown in FIG. 1, the first transistor T1, the second transistor T2, and the third transistor T3 may be implemented as P-type metal oxide semiconductor (PMOS) transistors. In this case, the first transistor T1, the second transistor T2, and the third transistor T3 are turned on when the first clock signal CLK1, the inversion control voltage VQB, and the control voltage VQ are at a logic low level L or lower level, respectively, and turned off when the first clock signal CLK1, the inversion control voltage VQB, and the control voltage VQ are at a logic high level H, respectively.

In some example embodiments, the first transistor T1, the second transistor T2, and the third transistor T3 may be implemented as N-type metal oxide semiconductor (NMOS) transistors. In this case, the first transistor T1, the second transistor T2, and the third transistor T3 are turned on when the first clock signal CLK1, the inversion control voltage VQB, and the control voltage VQ are at a logic high level H or higher level, respectively, and turned off when the first clock signal CLK1, the inversion control voltage VQB, and the control voltage VQ are at a logic low level L, respectively. In some example embodiments, the logic high level H may correspond to the gate high voltage VGH, and the logic low level L may correspond to the gate low voltage VGL.

While example embodiments are described herein with particular reference to cases in which the first transistor T1, the second transistor T2, and the third transistor T3 are implemented with PMOS transistors, those skilled in the art of display devices will understand that example embodiments may also be applicable in which the first transistor T1, the second transistor T2, and the third transistor T3 are implemented with NMOS transistors.

Figure 2:
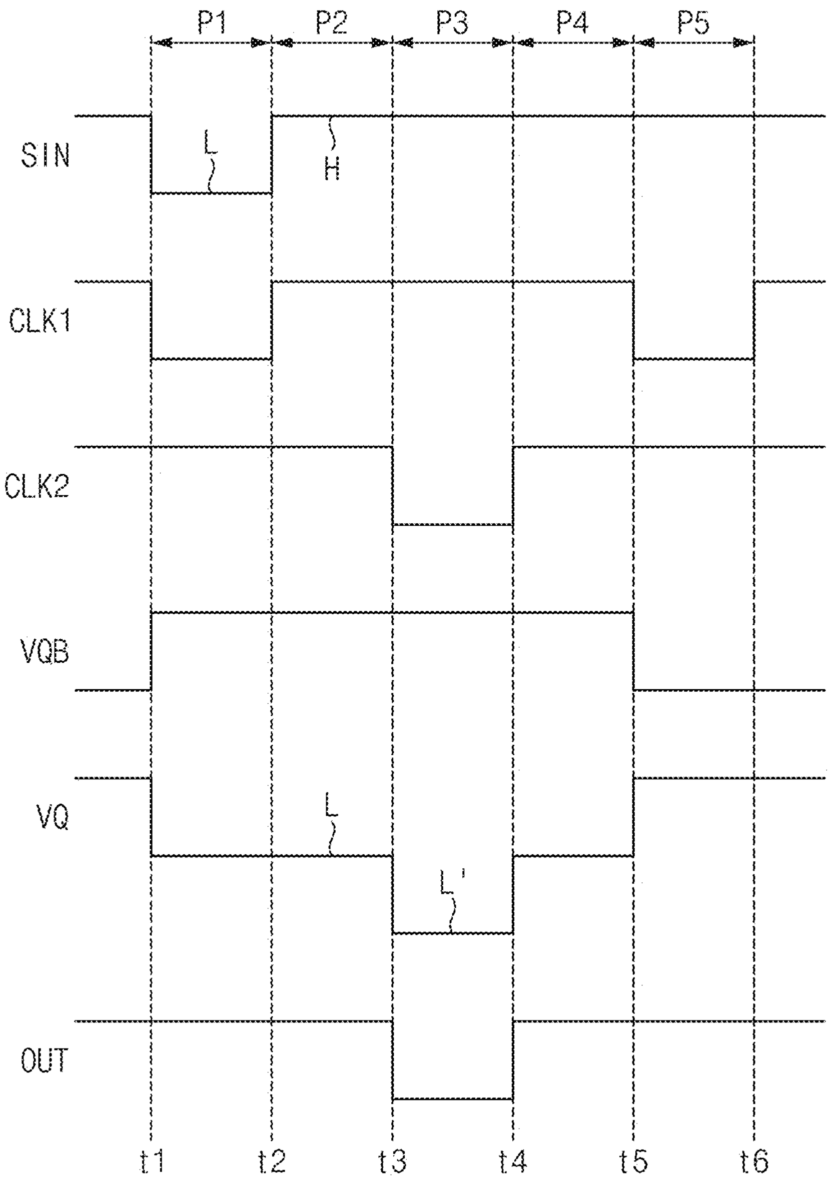
FIG. 2 is a timing diagram illustrating an operation of a stage circuit according to example embodiments.

FIG. 2 is a timing diagram illustrating an operation of a stage circuit according to example embodiments.

Referring to FIG. 2, the first clock signal CLK1 and the second clock signal CLK2 may have the same clock cycle, and may have a phase difference of 180 degrees from each other. Each of the first clock signal CLK1 and the second clock signal CLK2 may be at the logic low level L for ¼ of the clock cycle. As will be described below with reference to FIG. 5, a horizontal time 1H allocated to drive one row of the display device may correspond to ½ of the clock cycle.

The operation of the stage circuit 10 may be described as a first operation period P1 between time points t1 and t2, a second operation period P2 between time points t2 and t3, a third operation period P3 between time points t3 and t4, a fourth operation period P4 between time points t4 and t5, and a fifth operation period P5 between time points t5 and t6.

Referring to FIGS. 1 and 2, in the first operation period P1, the first clock signal CLK1 and the input signal SIN may be at the logic low level L and the second clock signal CLK2 may be at the logic high level H. At this time, the control voltage VQ may be at the logic low level L and the inversion control voltage VQB may be at the logic high level H.

In the second operation period P2 after the first operation period P1, the first clock signal CLK1, the second clock signal CLK2 and the input signal SIN may be at the logic high level H. At this time, the control voltage VQ may maintain the logic low level L and the inversion control voltage VQB may maintain the logic high level H.

In the third operation period P3 after the second operation period P2, the second clock signal CLK2 may be at the logic low level L, and the first clock signal CLK1 and the input signal SIN may be at the logic high level H. At this time, the control voltage VQ may be boosted, by coupling of the first capacitor C1, to a boosting level L' lower than the logic low level L.

In the fourth operation period P4 after the third operation period P3, the first clock signal CLK1, the second clock signal CLK2, and the input signal SIN may be at the logic high level H. At this time, the control voltage VQ may be restored to the logic low level L from the boosting level L', and the inversion control voltage VQB may maintain the logic high level H.

In the fifth operation period P5 after the fourth operation period P4, the first clock signal CLK1 may be at the logic low level L and the input signal SIN and the second clock signal CLK2 may be at the logic high level H. At this time, the control voltage VQ may be at the logic high level H and the inversion control voltage VQB may be at the logic low level L.

As a result, the output signal SOUT may be at the logic low level L in the third operation period P3 and at the logic high level H in the first operation period P1, the second operation period P2, the fourth operation period P4, and the fifth operation period P5. The third operation period P3 may be referred to as the output period.

Meanwhile, the reversal control voltage VQB may be at the logic low level L in the fifth operation period P5 and at the logic high level H in the first operation period P1, the second operation period P2, the third operation period P3, and the fourth operation period P4. The fifth operation period P5 may be referred to as a reset period.

Meanwhile, the input signal SIN may be at the logic low level L in the first operation period P1, and the first clock signal CLK1 may also be at the logic low level L in the first operation period P1, such that the activation level of the input signal SIN may be sampled at the control terminal Q. The first operation period P1 may be referred to as a detection period.

Hereinafter, example embodiments of a display device and a gate driver to which the stage circuit 10 is applied according to example embodiments will be described with reference to FIGS. 3, 4 and 5.

Figure 3:
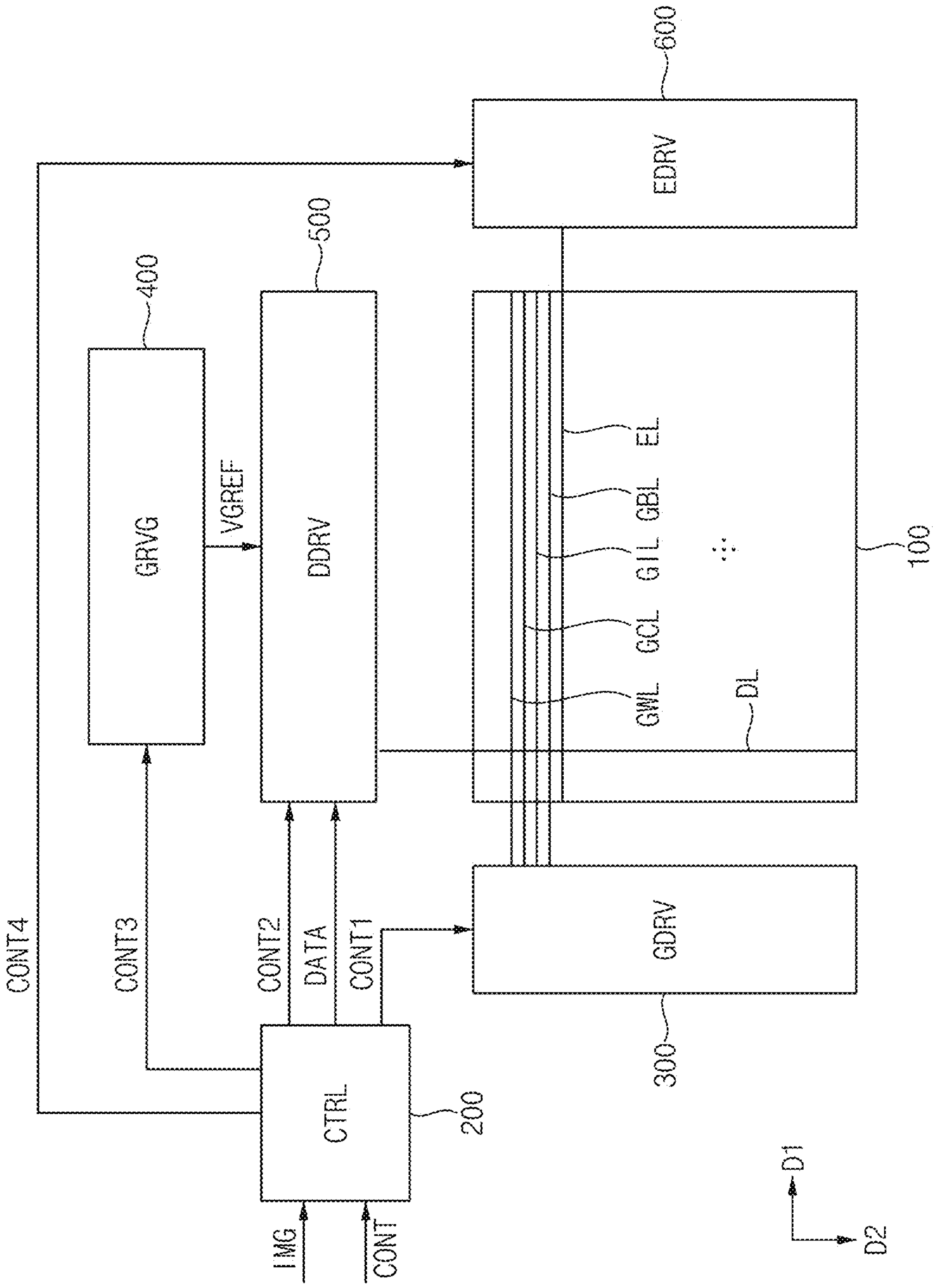
FIG. 3 is a block diagram illustrating a display device according to example embodiments.

FIG. 3 is a block diagram illustrating a display device according to example embodiments.

Referring to FIG. 3, a display device includes a display panel 100 and a display panel driver. The display panel driver includes a drive controller ("CTRL") 200, a gate driver ("GDRV") 300, a gamma reference voltage generator ("GRVG") 400, a data driver ("DDRV") 500, and an emission driver ("EDRV") 600.

The display panel 100 includes a display portion for displaying an image and a peripheral portion disposed adjacent to the display portion.

The display panel 100 includes a plurality of gate lines GWL, GCL, GIL and GBL, a plurality of data lines DL, a plurality of emission lines EL, and a plurality of pixels electrically connected to each of the gate lines GWL, GCL, GIL and GBL, the data lines DL, and the emission lines EL. The gate lines GWL, GCL, GIL and GBL extend in a first direction D1, the data lines DL extend in a second direction D2 intersecting the first direction D1, and the emission lines EL extend in the first direction D1.

The drive controller 200 receives input image data IMG and input control signals CONT from an external device. For example, the input image data IMG may include red image data, green image data, and blue image data. According to example embodiments, the input image data IMG may include white image data, magenta image data, yellow image data, and/or cyan image data. The input control signal CONT may include a master clock signal, a data enable signal, and/or a data enable signal. The input control signal CONT may further include a vertical synchronization signal and a horizontal synchronization signal.

The drive controller 200 generates a first control signal CONT1, a second control signal CONT2, a third control signal CONT3, a fourth control signal CONT4, and a data signal DATA based on the input image data IMG and the input control signal CONT.

The drive controller 200 generates the first control signal CONT1 for controlling the operation of the gate driver 300 based on the input control signal CONT and outputs the first control signal CONT1 to the gate driver 300. The first control signal CONT1 may include a vertical start signal and a gate clock signal.

The drive controller 200 generates the second control signal CONT2 for controlling the operation of the data driver 500 based on the input control signal CONT and outputs the second control signal CONT2 to the data driver 500. The second control signal CONT2 may include a horizontal start signal and a load signal.

The drive controller 200 generates the data signal DATA based on the input image data IMG, and outputs the data signal DATA to the data driver 500.

The drive controller 200 generates the third control signal CONT3 for controlling the operation of the gamma reference voltage generator 400 based on the input control signal CONT, and outputs the third control signal CONT3 to the gamma reference voltage generator 400.

The drive controller 200 generates the fourth control signal CONT4 for controlling the operation of the emission driver 600 based on the input control signal CONT, and outputs the fourth control signal CONT4 to the emission driver 600.

The gate driver 300 generates the gate signals for driving the gate lines GWL, GCL, GIL and GBL in response to the first control signal CONT1 input from the drive controller 200. The gate driver 300 may output the gate signals to the gate lines GWL, GCL, GIL and GBL.

The gamma reference voltage generator 400 generates a gamma reference voltage VGREF in response to the third control signal CONT3 input from the drive controller 200. The gamma reference voltage generator 400 provides the gamma reference voltage VGREF to the data driver 500. The gamma reference voltage VGREF may have a voltage level corresponding to each data signal DATA. For example, the gamma reference voltage generator 400 may be disposed within the drive controller 200 or may be disposed within the data driver 500.

The data driver 500 receives the second control signal CONT2 and the data signal DATA from the drive controller 200, and receives the gamma reference voltage VGREF from the gamma reference voltage generator 400. The data driver 500 converts the data signal DATA into an analog form of the data voltage using the gamma reference voltage VGREF. The data driver 500 outputs the data voltage to the data line DL.

The emission driver 600 generates emission signals to drive the emission lines EL in response to the fourth control signal CONT4 input from the drive controller 200, and outputs the emission signals to the emission lines EL.

In FIG. 3, for convenience of illustration, the gate driver 300 is shown disposed on a first side of the display panel 100 and the emission driver 600 is shown disposed on a second side of the display panel 100, but example embodiments are not limited thereto. For example, both the gate driver 300 and the emission driver 600 may be disposed on the first side of the display panel 100. For example, the gate driver 300 and the emission driver 600 may be integrally formed.

Figure 4:
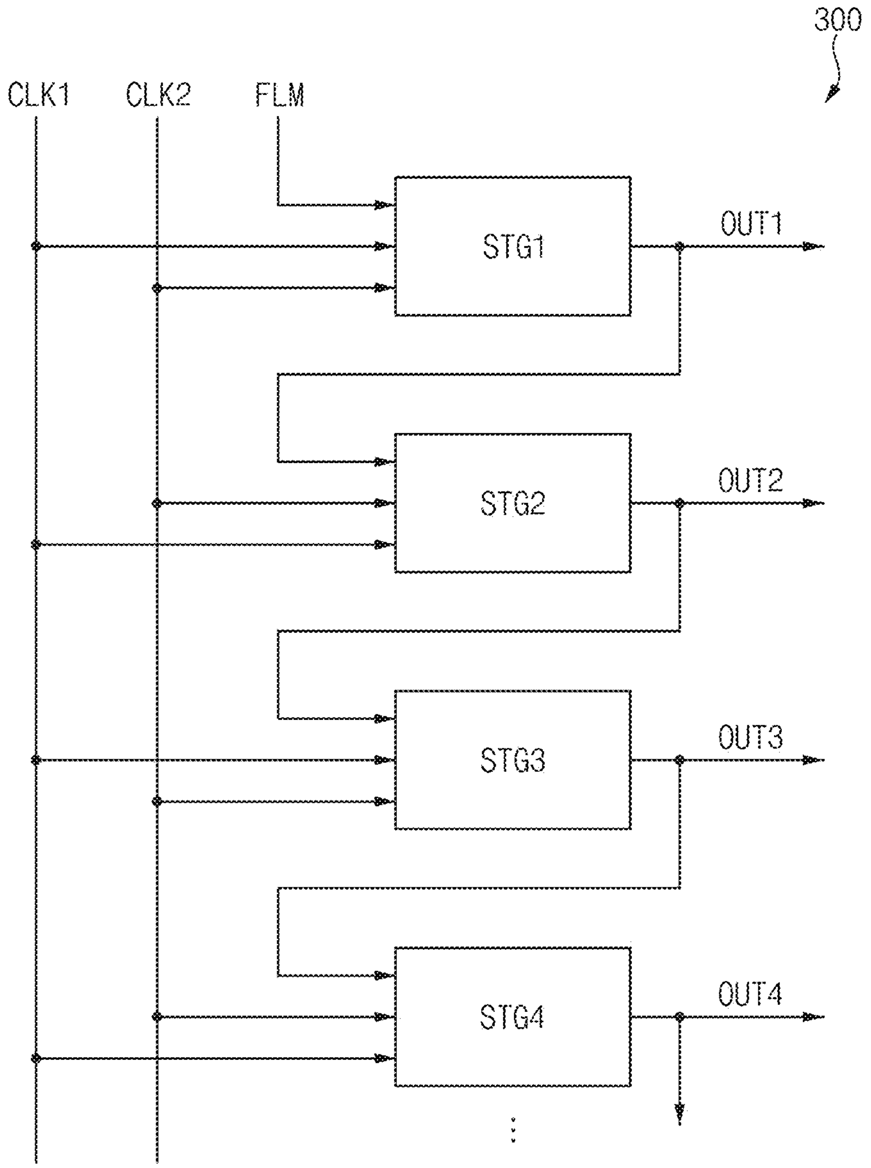
FIG. 4 is a block diagram illustrating an example embodiment of a gate driver included in a display device according to example embodiments.
Figure 5:
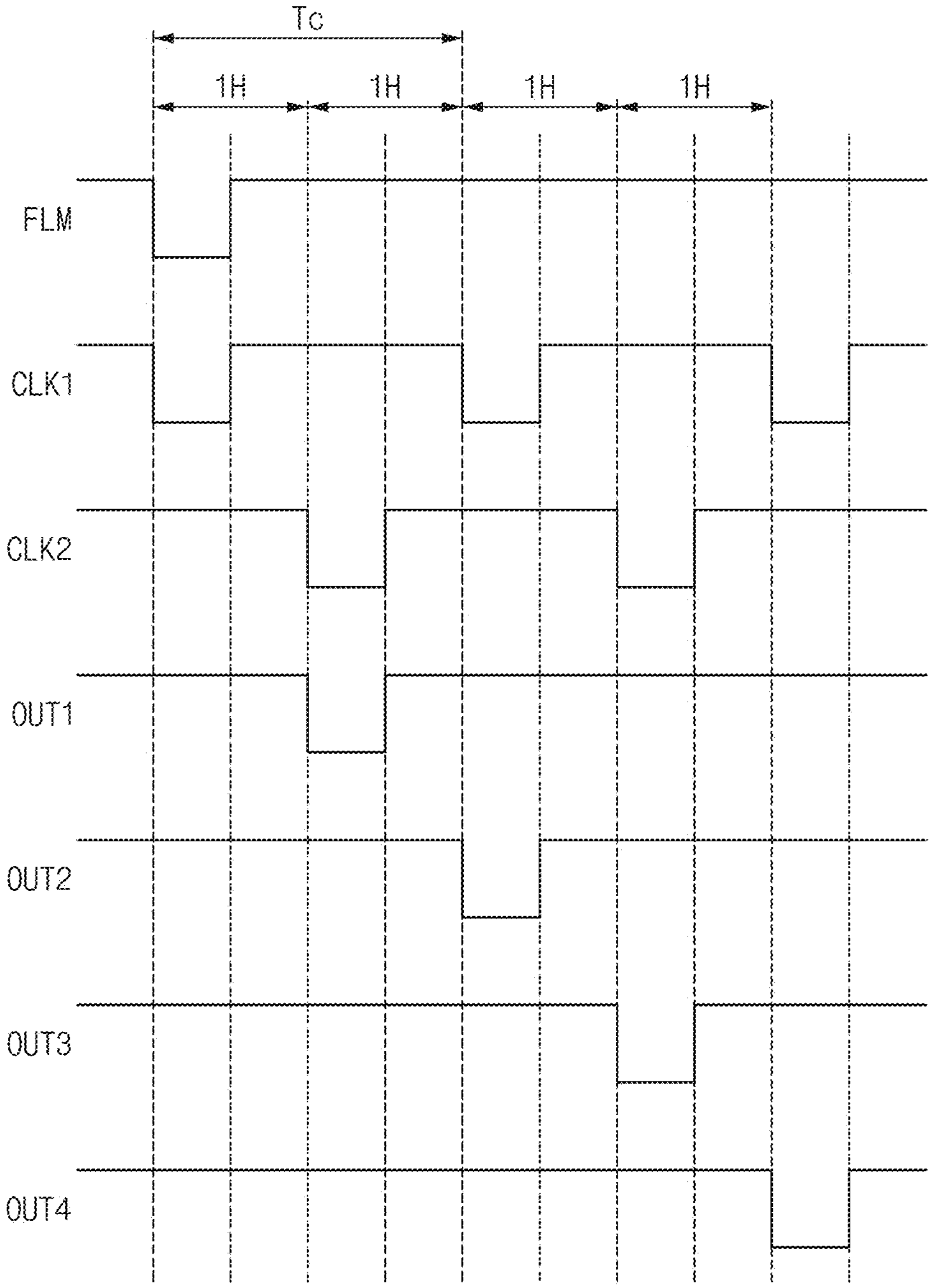
FIG. 5 is a timing diagram illustrating an example operation of the gate driver of FIG. 4.

FIG. 4 is a block diagram illustrating an example embodiment of a gate driver included in a display device according to example embodiments, and FIG. 5 is a timing diagram illustrating an example operation of the gate driver of FIG. 4.

The following description will focus on an example embodiment in which a stage circuit according to example embodiments is applied to a gate driver, but the example embodiments are not limited thereto. The stage circuit according to example embodiments may be employed in a gate driver 300, or may be employed in an emission driver 600.

Referring to FIG. 4, the gate driver 300 may include a plurality of stage circuits STG1, STG2, STG3 and STG4. The gate driver 300 may be implemented in the form of a shift register in which the plurality of stage circuits STG1, STG2, STG3 and STG4 sequentially generate output signals OUT1, OUT2, OUT3 and OUT4. Furthermore, the gate driver 300 may be formed on the display panel 100 of the display device as a driver included in the display device. For example, the gate driver 300 may be integrated or formed on a substrate of the display panel 100.

The plurality of stage circuits STG1, STG2, STG3 and STG4 may sequentially generate the output signals OUT1, OUT2, OUT3 and OUT4 as the aforementioned output signals SOUT based on a start signal FLM, the first clock signal CLK1, and the second clock signal CLK2. Further, the first stage circuit STG1 may receive the start signal FLM as the aforementioned input signal SIN, and each of the subsequent stage circuits STG2, STG3 and STG4 may receive the output signal of the previous stage circuit as the aforementioned input signal SIN. For example, the second stage circuit STG2 may receive the first output signal OUT1 of the first stage circuit STG1 as the input signal SIN, the third stage circuit STG3 may receive the second output signal OUT2 of the second stage circuit STG2 as the input signal SIN, and the fourth stage circuit STG4 may receive the third output signal OUT3 of the third stage circuit STG3 as the input signal SIN.

Further, in an example embodiment, each odd-numbered stage circuit STG1 and STG3 may start outputting the output signals OUT1 and OUT3 when the first clock signal CLK1 has the logic high level, and each even-numbered stage circuit STG2 and STG4 may start outputting the output signal OUT2 and OUT4 when the second clock signal CLK2 has the logic high level.

For example, as shown in FIGS. 4 and 5, when the first clock signal CLK1 becomes the logic high level after the start signal FLM becomes the logic high level, the first stage circuit STG1 may start outputting the first output signal OUT1 having the logic high level. Also, when the first clock signal CLK1 becomes the logic high level after the start signal FLM becomes the logic low level, the first stage circuit STG1 may begin to output the first output signal OUT1 having the logic low level.

When the first output signal OUT1 becomes the logic high level and the second clock signal CLK2 becomes the logic high level, the second stage circuit STG2 may begin to output the second output signal OUT2 having the logic high level. Also, after the first output signal OUT1 becomes the logic low level, when the second clock signal CLK2 becomes the logic high level, the second stage circuit STG2 may begin to output the second output signal OUT2 having the logic low level.

After the second output signal OUT2 becomes the logic high level, when the first clock signal CLK1 becomes the logic high level, the third stage circuit STG3 may begin to output the third output signal OUT3 having the logic high level. Also, when the second output signal OUT2 becomes the logic low level and the first clock signal CLK1 becomes the logic high level, the third stage circuit STG3 may begin to output the third output signal OUT3 having the logic low level.

After the third output signal OUT3 becomes the logic high level, when the second clock signal CLK2 becomes the logic high level, the fourth stage circuit STG4 may begin to output the fourth output signal OUT4 having the logic high level. Further, when the third output signal OUT3 becomes the logic low level and the second clock signal CLK2 becomes the logic high level, the fourth stage circuit STG4 may begin to output the fourth output signal OUT4 having the logic low level.

In this way, the plurality of stage circuits STG1, STG2, STG3 and STG4 may sequentially output the output signals OUT1, OUT2, OUT3 and OUT4 while delaying or shifting the output signals OUT1, OUT2, OUT3 and OUT4 by ½ of the clock cycle Tc of the first clock signal CLK1 and the second clock signal CLK2. As a result, the first clock signal CLK1 and the second clock signal CLK2 may be at the logic low level L for ¼ of the clock cycle Tc, and may be 180 degrees out of phase with each other. The horizontal time 1H allocated to drive one row of the display device may correspond to ½ of the clock cycle Tc.

Figure 6:
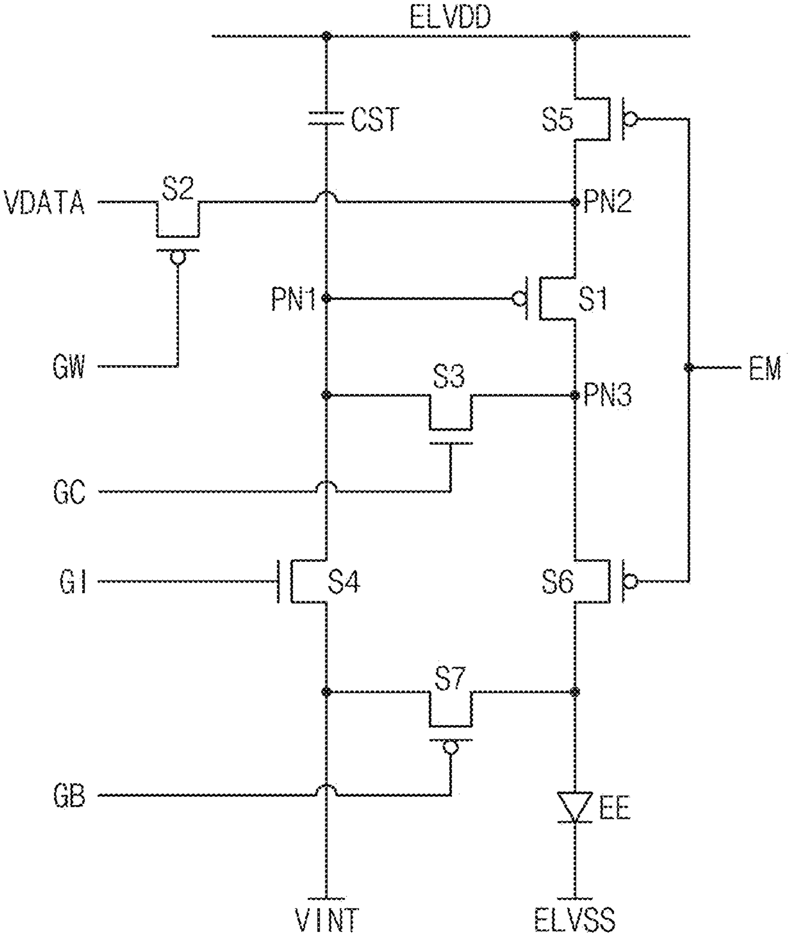
FIG. 6 is a circuit diagram illustrating an example embodiment of a pixel included in a display panel according to example embodiments.
Figure 7:
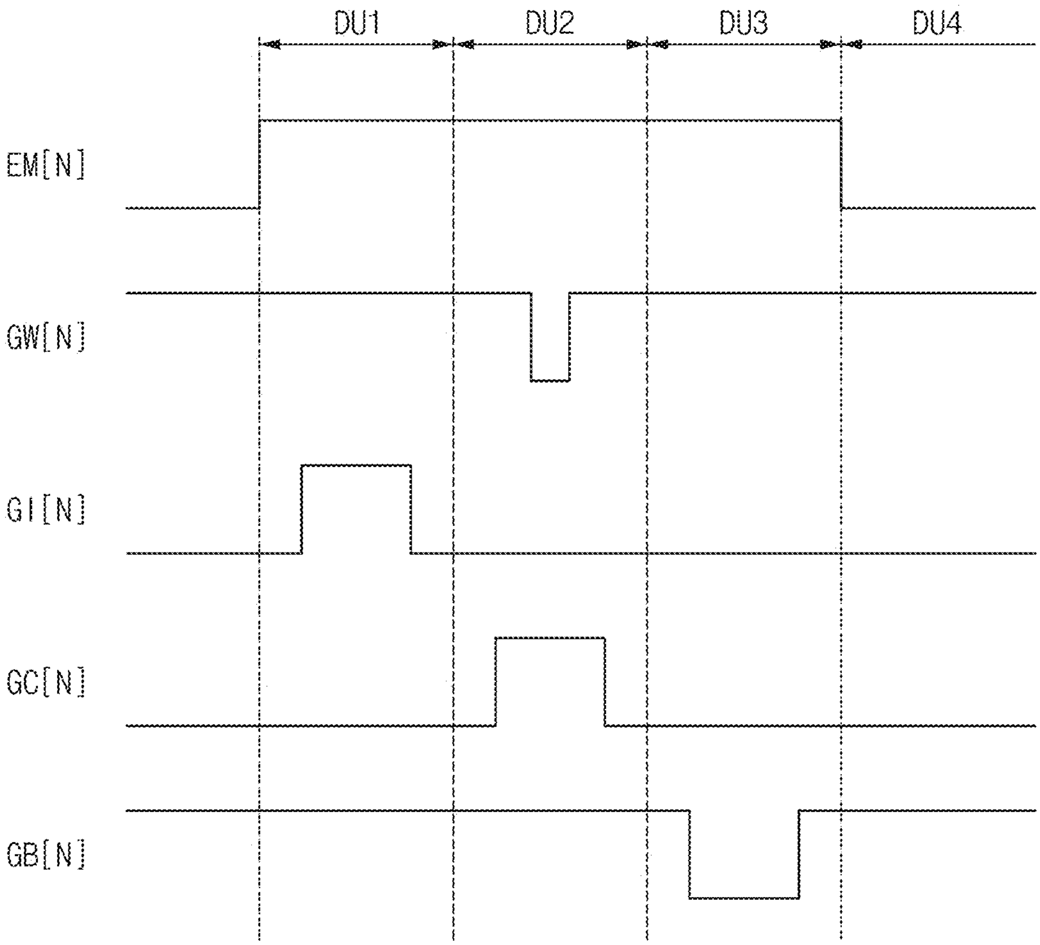
FIG. 7 is a timing diagram illustrating input signals to the pixel of FIG. 6.

FIG. 6 is a circuit diagram illustrating an example embodiment of a pixel included in a display panel according to example embodiments, and FIG. 7 is a timing diagram illustrating input signals to the pixel of FIG. 6.

Referring to FIGS. 3 through 7, the display panel 100 includes a plurality of pixels, each of which includes a light emitting element EE.

The pixels receive a write gate signal GW, a compensation gate signal GC, a data initialization gate signal GI, a light emitting element initialization gate signal GB, a data voltage VDATA, and an emission signal EM, and display the image by emitting the light emitting element EE according to the level of the data voltage VDATA.

In this example embodiment, the pixel may include a switching element of a first type and a switching element of a second type that is different from the first type. For example, the first type of switching element may be a P-type transistor, and the second type of switching element may be an N-type transistor.

For example, the first type of switching element may be a polycrystalline silicon thin film transistor. For example, the switching element of the first type may be a low temperature polycrystalline silicon ("LTPS") thin film transistor. For example, the switching element of the second type may be an oxide thin film transistor.

At least one of the pixels may include a first to seventh pixel switching element S1 to S7, a storage capacitor CST, and a light emitting element EE.

The first pixel switching element S1 includes a control electrode connected to a first pixel node PN1, a first electrode connected to a second pixel node PN2, and a second electrode connected to a third pixel node PN3.

The second pixel switching element S2 includes a control electrode to which the write gate signal GW is applied, a first electrode to which the data voltage VDATA is applied, and a second electrode connected to the second pixel node PN2.

The third pixel switching element S3 includes a control electrode to which the compensation gate signal GC is applied, a first electrode connected to the first pixel node PN1, and a second electrode connected to the third pixel node PN3.

The fourth pixel switching element S4 includes a control electrode to which the data initialization gate signal GI is applied, a first electrode to which an initialization voltage VINT is applied, and a second electrode connected to the first pixel node PN1.

The fifth pixel switching element S5 includes a control electrode to which the emission signal EM is applied, a first electrode to which a high power supply voltage ELVDD is applied, and a second electrode connected to the second pixel node PN2.

The sixth pixel switching element S6 includes a control electrode to which the emission signal EM is applied, a first electrode connected to the third pixel node PN3, and a second electrode connected to an anode electrode of the light emission element EE.

The seventh pixel switching element S7 includes a control electrode to which the light emitting element initialization gate signal GB is applied, a first electrode to which the initialization voltage VINT is applied, and a second electrode connected to the anode electrode of the light emitting element EE.

The storage capacitor CST includes a first electrode to which the high supply voltage ELVDD is applied and a second electrode connected to the first pixel node PN1.

The light emitting element EE includes an anode electrode and a cathode electrode to which a low supply voltage ELVSS is applied.

In an example embodiment, as shown in FIG. 6, the third pixel switching element S3 and the fourth pixel switching element S4 may be N-type transistors, and the first pixel switching element S1, the second pixel switching element S2, the fifth pixel switching element S5, the sixth pixel switching element S6, and the seventh pixel switching element S7 may be P-type transistors.

Referring to FIG. 7, during the first interval DU1, the first pixel node PN1 and the storage capacitor CST are initialized by the data initialization gate signal GI. During the second interval DU2, the threshold voltage |VTH| of the first pixel switching element S1 is compensated by the write gate signal GW and the compensation gate signal GC, and the data voltage VDATA compensated by the threshold voltage |VTH| is written to the first pixel node PN1. During the third interval DU3, the anode electrode of the light emitting element EE is initialized by the light emitting element initialization gate signal GB. During the fourth interval DU4, the light emitting element EE is emitted by the emission signal EM, and the display panel 100 displays the image.

In some example embodiments, the off intervals of the emission signal EM are the first, second and third intervals DU1, DU2 and DU3, but example embodiments are not limited thereto. The off interval of the emission signal EM may include the data entry interval DU2, and the off interval of the emission signal EM may be longer than the first, second and third intervals DU1, DU2 and DU3.

In the first segment DU1, the data initialization gate signal GI may have an activation level. For example, the activation level of the data initialization gate signal GI may be a high level. When the data initialization gate signal GI has the activation level, the fourth pixel switching element S4 may be turned on, such that an initialization voltage VINT may be applied to the first pixel node PN1.

In the second interval DU2, the write gate signal GW and the compensation gate signal GC may have an activation level. For example, the activation level of the write gate signal GW may be a low level, and the activation level of the compensation gate signal GC may be a high level. When the write gate signal GW and the compensation gate signal GC have the above activation levels, the second pixel switching element S2 and the third pixel switching element S3 are turned on. In addition, the first pixel switching element S1 is also turned on by the initialization voltage VINT.

Along the path formed by the turned-on first to third pixel switching elements S1, S2 and S3, a voltage is set at the first pixel node PN1 equal to the data voltage VDATA minus the absolute value |VTH| of the threshold voltage of the first pixel switching element S1.

In the third interval DU3, the light emitting element initialization gate signal GB may have an activation level. For example, the activation level of the light emitting element initialization gate signal GB may be a logic low level. When the light-emitting element initialization gate signal GB has the above activation level, the seventh pixel switching element S7 may be turned on, and an initialization voltage VINT may be applied to the anode electrode of the light emitting element EE.

FIG. 7 illustrates a case in which the initialization voltage applied to the fourth pixel switching element S4 and the initialization voltage applied to the seventh pixel switching element S7 are the same, but example embodiments are not limited thereto. Depending on example embodiment, the initialization voltage applied to the fourth pixel switching element S4 and the initialization voltage applied to the seventh pixel switching element S7 may be different.

In the fourth interval DU4, the emission signal EM may have an activation level. For example, the activation level of the emission signal EM may be a logic low level. When the emission signal EM has the activation level, the fifth pixel switching element S5 and the sixth pixel switching element S6 are turned on. In addition, the first pixel switching element S1 is also turned on by the data voltage VDATA.

The driving current may flow in the order of the fifth pixel switching element S5, the first pixel switching element S1, and the sixth pixel switching element S6 to drive the light emitting element EE. The strength of the driving current may be determined by the level of the data voltage VDATA. The brightness of the light emitting element EE may be determined by the strength of the driving current.

In FIG. 7, [N] refers to the signal of the current stage circuit, and in FIG. 7. Since the signal of the previous stage circuit or the next stage circuit is not applied to the pixel, [N] may be omitted.

The stage circuit according to example embodiments may be used to generate at least one of the write gate signal GW, the compensation gate signal GC, the data initialization gate signal GI, and the light emitting element initialization gate signal GB.

Figure 8:
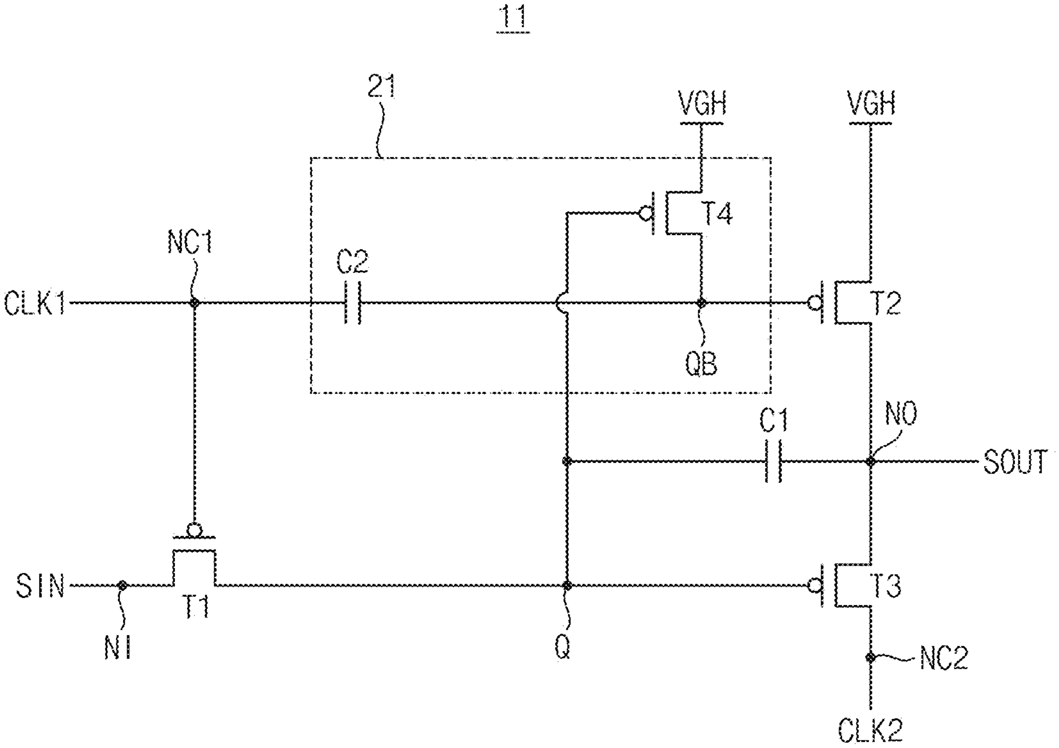
FIG. 8 is a circuit diagram illustrating a stage circuit according to an example embodiment.
Figure 10A:
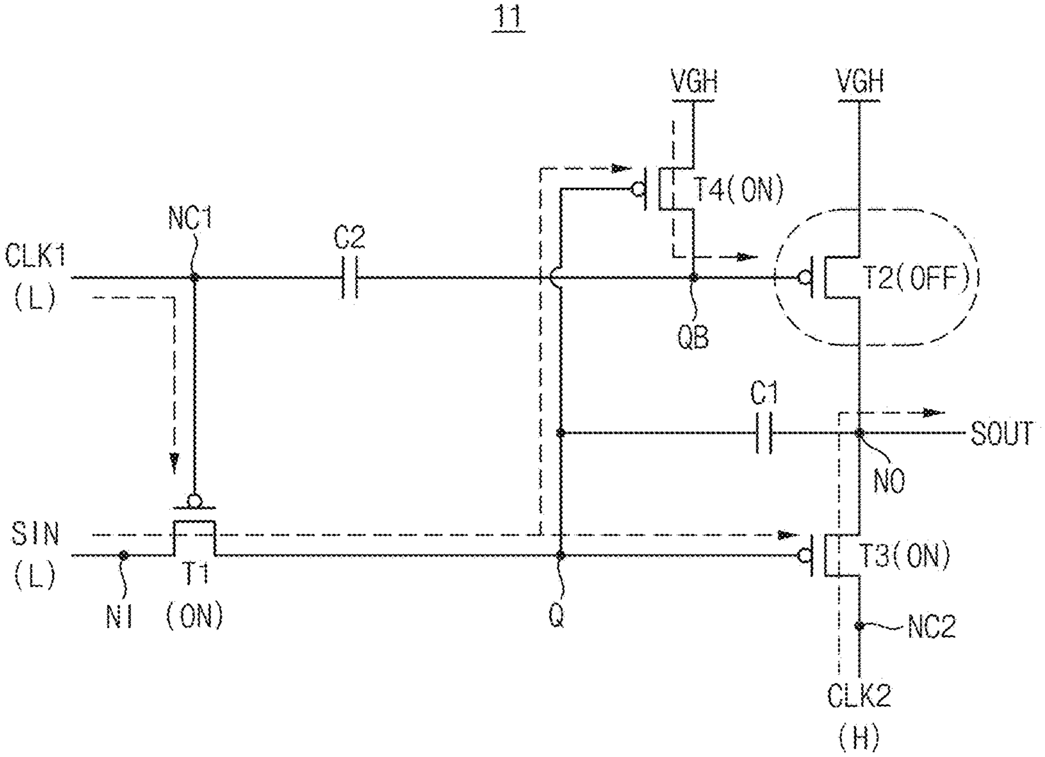
FIGS. 10A through 10E are diagrams illustrating operation of the stage circuit of FIG. 8.
Figure 10B:
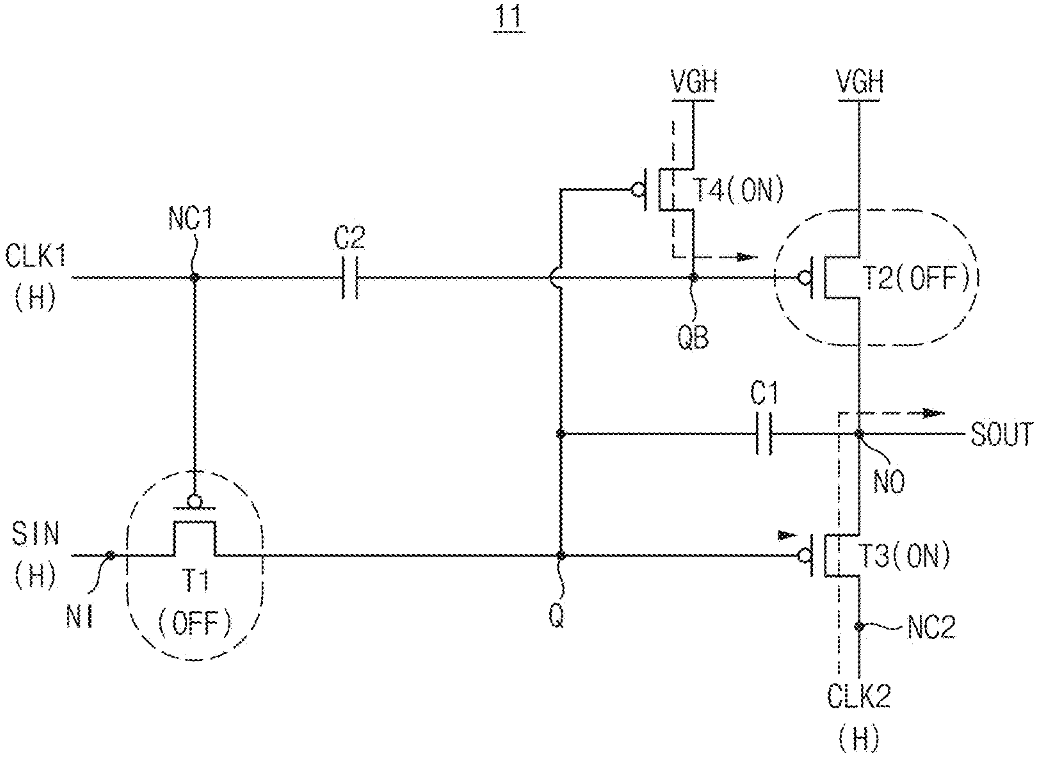
Figure 10C:
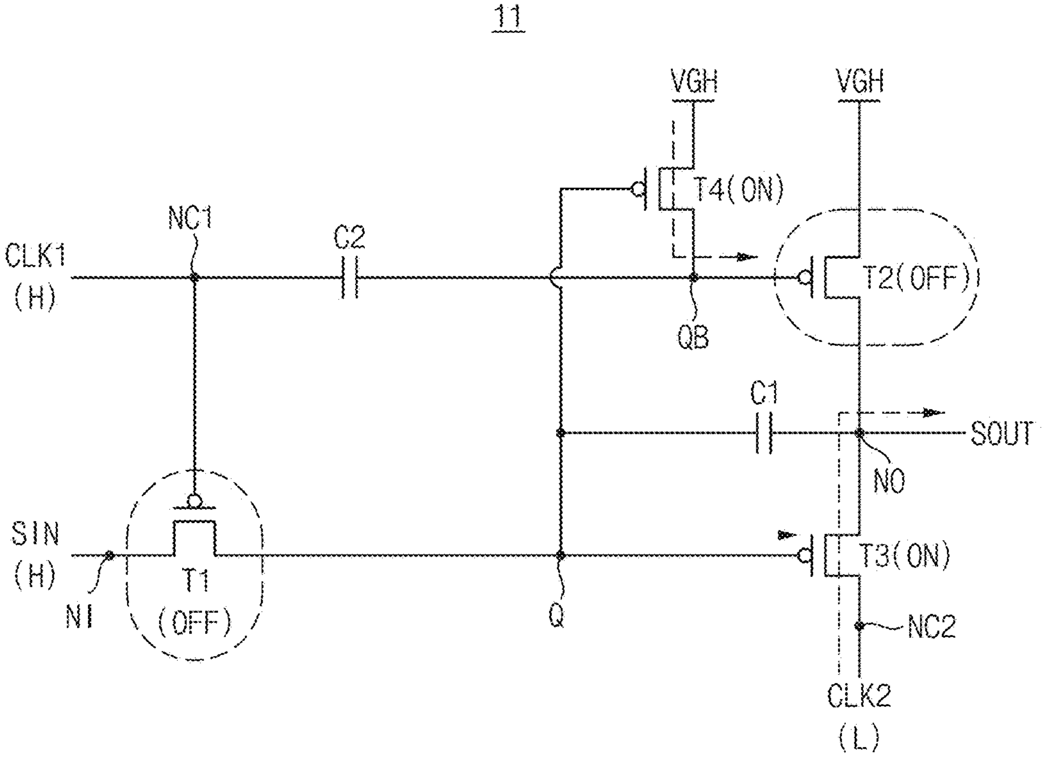
Figure 10D:
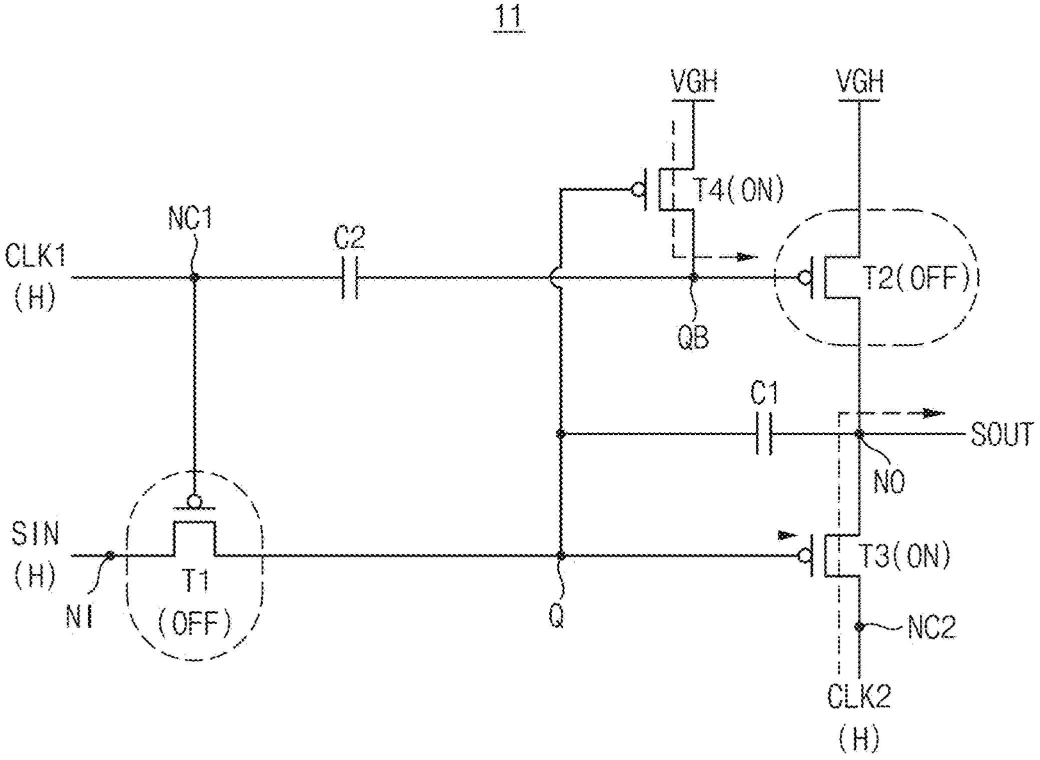
Figure 10E:
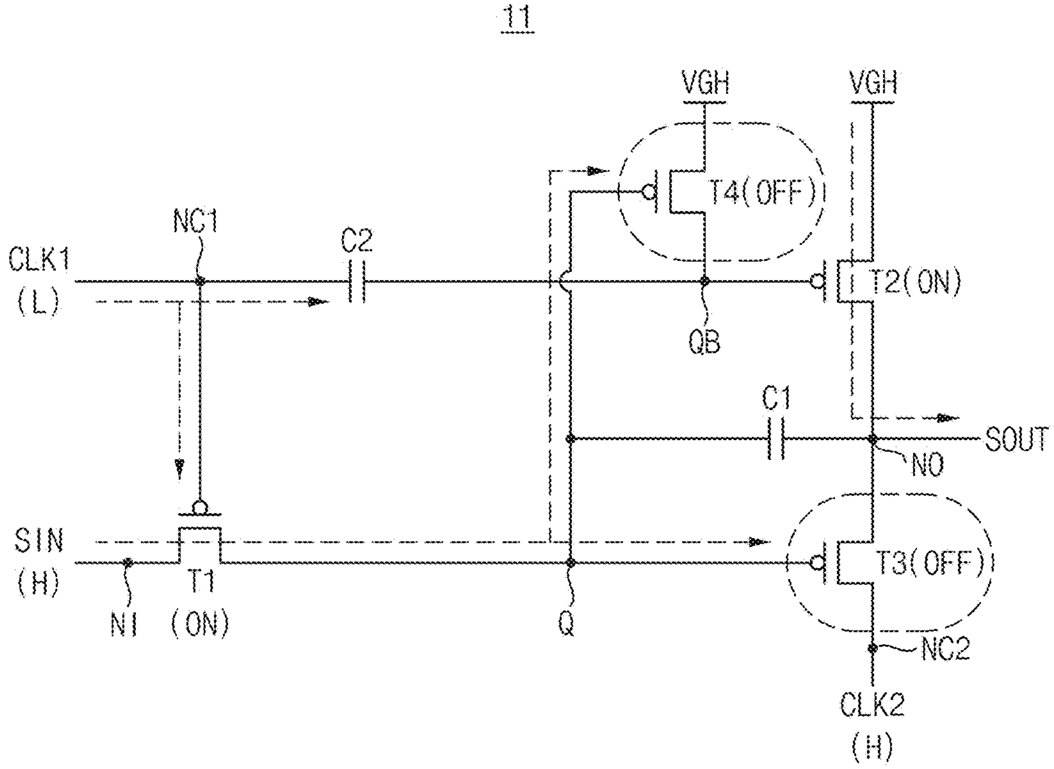

FIG. 8 is a circuit diagram illustrating a stage circuit according to an example embodiment.

Referring to FIG. 8, a stage circuit 11 includes a first transistor T1, a second transistor T2, a third transistor T3, a first capacitor C1 and a control circuit 21.

The first transistor T1 is connected between an input terminal NI and a control terminal Q receiving an input signal SIN, and the first transistor T1 includes a gate electrode connected to a first clock terminal NC1 receiving a first clock signal CLK1. The second transistor T2 is connected between a line supplying a gate high voltage VGH and an output terminal NO generating an output signal SOUT, and the second transistor includes a gate electrode connected to an inversion control terminal QB. The third transistor T3 is connected between the output terminal NO and the second clock terminal NC2 receiving the second clock signal CLK2, and the third transistor T3 includes a gate electrode connected to the control terminal Q. The first capacitor C1 is connected between the control terminal Q and the output terminal NO.

The control circuit 21 may include a fourth transistor T4 and a second capacitor C2.

The fourth transistor T4 is connected between a line supplying the gate high voltage VGH and the inversion control terminal QB and the fourth transistor T4 includes a gate electrode connected to the control terminal Q. The second capacitor C2 may be connected between the first clock terminal NC1 and the inversion control terminal QB.

In an example embodiment, as shown in FIG. 8, the first transistor T1, the second transistor T2, the third transistor T3, and the fourth transistor T4 may be implemented as PMOS transistors.

FIG. 9 is a diagram illustrating logic levels of signals and operations of transistors according to operation periods of the stage circuit of FIG. 8, and FIGS. 10A through 10E are diagrams illustrating operation of the stage circuit of FIG. 8. In FIGS. 10A through 10E, dashed arrows indicate paths for signals to be transferred, and dashed ellipses indicate transistors that are turned off.

Referring to FIGS. 2. 8, 9, and 10A, in the first operation period P1, the first clock signal CLK1 and the input signal SIN may be at a logic low level L and the second clock signal CLK2 may be at a logic high level H. At this time, the first transistor T1 the third transistor T3, and the fourth transistor T4 may be turned on, and the second transistor T2 may be turned off. As a result, the control voltage VQ may be at the logic low level L, and the inversion control voltage VQB may be at the logic high level H.

Referring to FIGS. 2. 8, 9, and 10B, in the second operation period P2, the first clock signal CLK1, the second clock signal CLK2 and the input signal SIN may be at the logic high level H. At this time, the third transistor T3 and the fourth transistor T4 may be turned on and the first transistor T1 and the second transistor T2 may be turned off. As a result, the control voltage VQ may maintain the logic low level L and the inversion control voltage VQB may maintain the logic high level H.

Referring to FIGS. 2. 8, 9, and 10C, in the third operation period P3, the second clock signal CLK2 may be at the logic low level L and the first clock signal CLK1 and the input signal SIN may be at the logic high level H. At this time, the third transistor T3 and the fourth transistor T4 may remain turned on and the first transistor T1 and the second transistor T2 may remain turned off. As a result, the control voltage VQ may be boosted to the boosting level L' lower than the logic low level L by the coupling of the first capacitor C1.

Referring to FIGS. 2. 8, 9, and 10D, in the fourth operation period P4, the first clock signal CLK1, the second clock signal CLK2 and the input signal SIN may be at the logic high level H. At this time, the third transistor T3 and the fourth transistor T4 may remain turned on and the first transistor T1 and the second transistor T2 may remain turned off. As a result, the control voltage VQ may be restored to the logic low level L from the boosting level L', and the inversion control voltage VQB may maintain the logic high level H.

Referring to FIGS. 2. 8, 9, and 10E, in the fifth operation period P5, the first clock signal CLK1 may be at the logic low level L and the input signal SIN and the second clock signal CLK2 may be at the logic high level H. At this time, the first transistor T1 and the second transistor T2 may be turned on, and the third transistor T3 and the fourth transistor T4 may be turned off. As a result, the control voltage VQ may be at the logic high level H, and the inversion control voltage VQB may be at the logic low level L.

Figure 11:
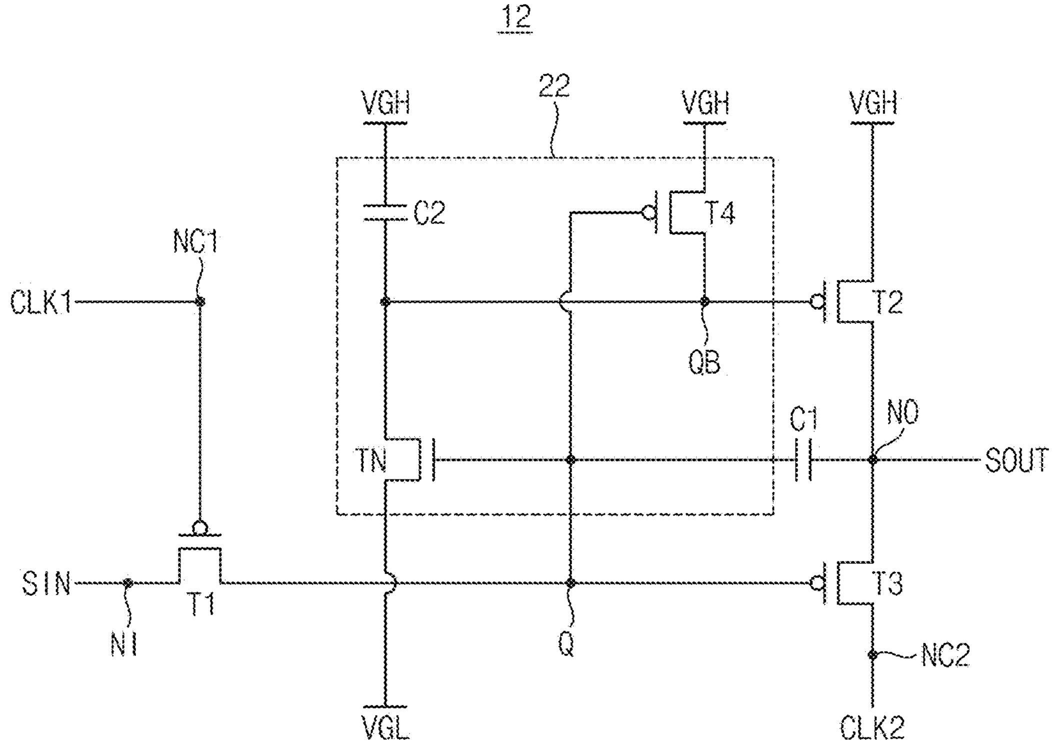
FIG. 11 is a circuit diagram illustrating a stage circuit according to another example embodiment.

FIG. 11 is a circuit diagram illustrating a stage circuit according to an example embodiment.

Referring to FIG. 11, a stage circuit 12 includes a first transistor T1, a second transistor T2, a third transistor T3, a first capacitor C1 and a control circuit 22.

The first transistor T1 is connected between an input terminal NI and a control terminal Q receiving an input signal SIN, and the first transistor T1 includes a gate electrode connected to a first clock terminal NC1 receiving a first clock signal CLK1. The second transistor T2 is connected between a line supplying a gate high voltage VGH and an output terminal NO generating an output signal SOUT, and the second transistor includes a gate electrode connected to an inversion control terminal QB. The third transistor T3 is connected between the output terminal NO and the second clock terminal NC2 receiving the second clock signal CLK2, and the third transistor T3 includes a gate electrode connected to the control terminal Q. The first capacitor C1 is connected between the control terminal Q and the output terminal NO.

The control circuit 22 may include a fourth transistor T4, an enhancement transistor TN and a second capacitor C2.

The fourth transistor T4 is connected between the line supplying the gate high voltage VGH and the inversion control terminal QB, and the fourth transistor T4 includes a gate electrode connected to the control terminal Q. The enhancement transistor TN is connected between the inversion control terminal QB and a line supplying the gate low voltage VGL, and enhancement transistor TN includes a gate electrode connected to the control terminal Q. The second capacitor C2 is connected between the line supplying the gate high voltage VGH and the inversion control terminal QB.

In an example embodiment, as shown in FIG. 11, the first transistor T1, the second transistor T2, the third transistor T3, and the fourth transistor T4 may be implemented with PMOS transistors, and the enhancement transistor TN may be implemented with an NMOS transistor.

FIG. 12 is a diagram illustrating logic levels of signals and operations of transistors according to operation periods of the stage circuit of FIG. 11. The input signal SIN, the first clock signal CLK1 and the second clock signal CLK2 are the same as described with reference to FIG. 2, and the redundant descriptions may be omitted.

Referring to FIGS. 2, 11, and 12, in the first operation period P1, the first transistor T1, the third transistor T3 and the fourth transistor T4 may be turned on, and the second transistor T2 and the enhancement transistor TN may be turned off. As a result, the control voltage VQ may be at the logic low level L and the inversion control voltage VQB may be at the logic high level H.

In the second operation period P2, the third transistor T3 and the fourth transistor T4 may be turned on, and the first transistor T1, the second transistor T2 and the enhancement transistor TN may be turned off. As a result, the control voltage VQ may maintain the logic low level L, and the inversion control voltage VQB may maintain the logic high level H.

In the third operation period P3, the third transistor T3 and the fourth transistor T4 may remain turned on, and the first transistor T1, the second transistor T2 and the enhancement transistor TN may remain turned off. As a result, the control voltage VQ may be boosted to the boosting level L' lower than the logic low level L by the coupling of the first capacitor C1.

In the fourth operation period P4, the third transistor T3 and the fourth transistor T4 may remain turned on, and the first transistor T1, the second transistor T2 and the enhancement transistor TN may remain turned off. As a result, the control voltage VQ may be restored to the logic low level L from the boosting level L', and the inversion control voltage VQB may maintain the logic high level H.

In the fifth operation period P5, the first transistor T1, the second transistor T2 and the enhancement transistor TN may be turned on, and the third transistor T3 and the fourth transistor T4 may be turned off. As a result, the control voltage VQ may be at the logic high level H, and the inversion control voltage VQB may be at the logic low level L.

Figure 13:
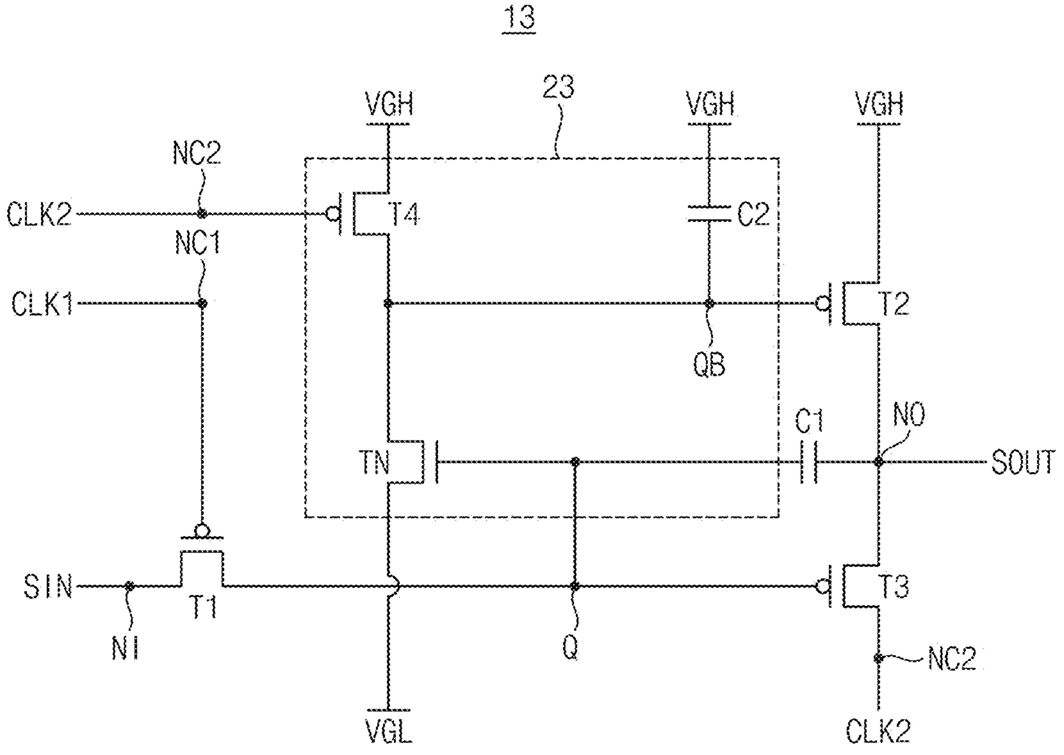
FIG. 13 is a circuit diagram illustrating a stage circuit according to still another example embodiment.

FIG. 13 is a circuit diagram illustrating a stage circuit according to an example embodiment.

Referring to FIG. 13, a stage circuit 13 includes a first transistor T1, a second transistor T2, a third transistor T3, a first capacitor C1 and a control circuit 23.

The first transistor T1 is connected between an input terminal NI and a control terminal Q receiving an input signal SIN, and the first transistor T1 includes a gate electrode connected to a first clock terminal NC1 receiving a first clock signal CLK1. The second transistor T2 is connected between a line supplying a gate high voltage VGH and an output terminal NO generating an output signal SOUT, and the second transistor includes a gate electrode connected to an inversion control terminal QB. The third transistor T3 is connected between the output terminal NO and the second clock terminal NC2 receiving the second clock signal CLK2, and the third transistor T3 includes a gate electrode connected to the control terminal Q. The first capacitor C1 is connected between the control terminal Q and the output terminal NO.

The control circuit 23 may include a fourth transistor T4, an enhancement transistor TN, and a second capacitor C2.

The fourth transistor T4 is connected between the line supplying the gate high voltage VGH and the inversion control terminal QB and the fourth transistor T4 includes a gate electrode connected to the second clock terminal NC2. The enhancement transistor TN is connected between the inversion control terminal QB and a line supplying the gate low voltage VGL, and the enhancement transistor TN includes a gate electrode connected to the control terminal Q. The second capacitor C2 is connected between the line supplying the gate high voltage VGH and the inversion control terminal QB.

In an example embodiment, as shown in FIG. 13, the first transistor T1, the second transistor T2, the third transistor T3 and the fourth transistor T4 may be implemented with PMOS transistors, and the enhancement transistor TN may be implemented with an NMOS transistor.

FIG. 14 is a diagram illustrating logic levels of signals and operations of transistors according to operation periods of the stage circuit of FIG. 13. The input signal SIN, the first clock signal CLK1 and the second clock signal CLK2 are the same as described with reference to FIG. 2, and the redundant descriptions may be omitted.

Referring to FIGS. 2, 13, and 14, in the first operation period P1, the first transistor T1, the second transistor T2, and the third transistor T3 may be turned on, and the fourth transistor T4 and the enhancement transistor TN may be turned off. As a result, the control voltage VQ may be at the logic low level L and the inversion control voltage VQB may be at the logic high level H.

In the second operation period P2, the second transistor T2 and the third transistor T3 may be turned on, and the first transistor T1, the fourth transistor T4 and the enhancement transistor TN may be turned off. As a result, the control voltage VQ may maintain the logic low level L, and the inversion control voltage VQB may maintain the logic high level H.

In the third operation period P3, the third transistor T3 and the fourth transistor T4 may be turned on, and the first transistor T1, the second transistor T2, and the enhancement transistor TN may be turned off. As a result, the control voltage VQ may be boosted to the boosting level L' lower than the logic low level L by the coupling of the first capacitor C1.

In the fourth operation period P4, the second transistor T2 and the third transistor T3 may be turned on, and the first transistor T1, the fourth transistor T4 and the enhancement transistor TN may be turned off. As a result, the control voltage VQ may be restored to the logic low level L from the boosting level L', and the inversion control voltage VQB may remain at the logic high level H.

In the fifth operation period P5, the first transistor T1, the second transistor T2 and the enhancement transistor TN may be turned on, and the third transistor T3 and the fourth transistor T4 may be turned off. As a result, the control voltage VQ may be at the logic high level H, and the inversion control voltage VQB may be at the logic low level L.

Figure 15:
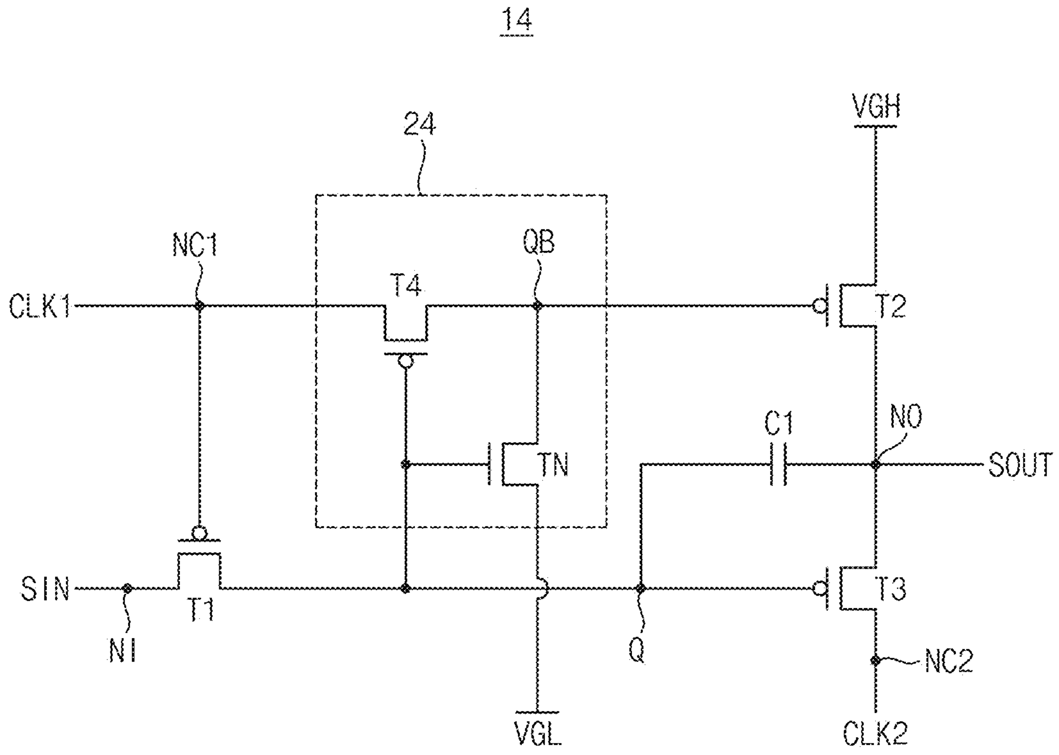
FIG. 15 is a circuit diagram illustrating a stage circuit according to yet another example embodiment.

FIG. 15 is a circuit diagram illustrating a stage circuit according to an example embodiment.

Referring to FIG. 15, a stage circuit 14 includes a first transistor T1, a second transistor T2, a third transistor T3, a first capacitor C1, and a control circuit 24.

The first transistor T1 is connected between an input terminal NI and a control terminal Q receiving an input signal SIN, and the first transistor T1 includes a gate electrode connected to a first clock terminal NC1 receiving a first clock signal CLK1. The second transistor T2 is connected between a line supplying a gate high voltage VGH and an output terminal NO generating an output signal SOUT, and the second transistor includes a gate electrode connected to an inversion control terminal QB. The third transistor T3 is connected between the output terminal NO and the second clock terminal NC2 receiving the second clock signal CLK2, and the third transistor T3 includes a gate electrode connected to the control terminal Q. The first capacitor C1 is connected between the control terminal Q and the output terminal NO.

The control circuit 24 may include a fourth transistor T4 and an enhancement transistor TN.

The fourth transistor T4 is connected between the first clock terminal NC1 and the inversion control terminal QB, and the fourth transistor T4 includes a gate electrode connected to the control terminal Q. The enhancement transistor TN is connected between the inversion control terminal QB and a line supplying the gate low voltage VGL, and the enhancement transistor TN includes a gate electrode connected to the control terminal Q.

In an example embodiment, as shown in FIG. 15, the first transistor T1, the second transistor T2, the third transistor T3 and the fourth transistor T4 may be implemented with PMOS transistors, and the enhancement transistor TN may be implemented with an NMOS transistor.

FIG. 16 is a diagram illustrating logic levels of signals and operations of transistors according to operation periods of the stage circuit of FIG. 15. The input signal SIN, the first clock signal CLK1 and the second clock signal CLK2 are the same as described with reference to FIG. 2, and the redundant descriptions may be omitted.

Referring to FIGS. 2, 15, and 16, in the first operation period P1, the first transistor T1, the second transistor T2, the third transistor T3 and the fourth transistor T4 may be turned on, and the enhancement transistor TN may be turned off. As a result, the control voltage VQ may be at the logic low level L and the inversion control voltage VQB may be at the logic high level H.

In the second operation period P2, the third transistor T3 and the fourth transistor T4 may be turned on, and the first transistor T1, the second transistor T2 and the enhancement transistor TN may be turned off. As a result, the control voltage VQ may maintain the logic low level L and the inversion control voltage VQB may maintain the logic high level H.

In the third operation period P3, the third transistor T3 and the fourth transistor T4 may remain turned on, and the first transistor T1, the second transistor T2 and the enhancement transistor TN may remain turned off. As a result, the control voltage VQ may be boosted to the boosting level L' lower than the logic low level L by the coupling of the first capacitor C1.

In the fourth operation period P4, the third transistor T3 and the fourth transistor T4 may remain turned on, and the first transistor T1, the second transistor T2, and the enhancement transistor TN may remain turned off. As a result, the control voltage VQ may be restored to the logic low level L from the boosting level L', and the inversion control voltage VQB may maintain the logic high level H.

In the fifth operation period P5, the first transistor T1, the second transistor T2 and the enhancement transistor TN may be turned on, and the third transistor T3 and the fourth transistor T4 may be turned off. As a result, the control voltage VQ may be at the logic high level H and the inversion control voltage VQB may be at the logic low level L.

FIGS. 17, 18, 19 and 20 are circuit diagrams illustrating stage circuits according to example embodiments.

Figure 17:
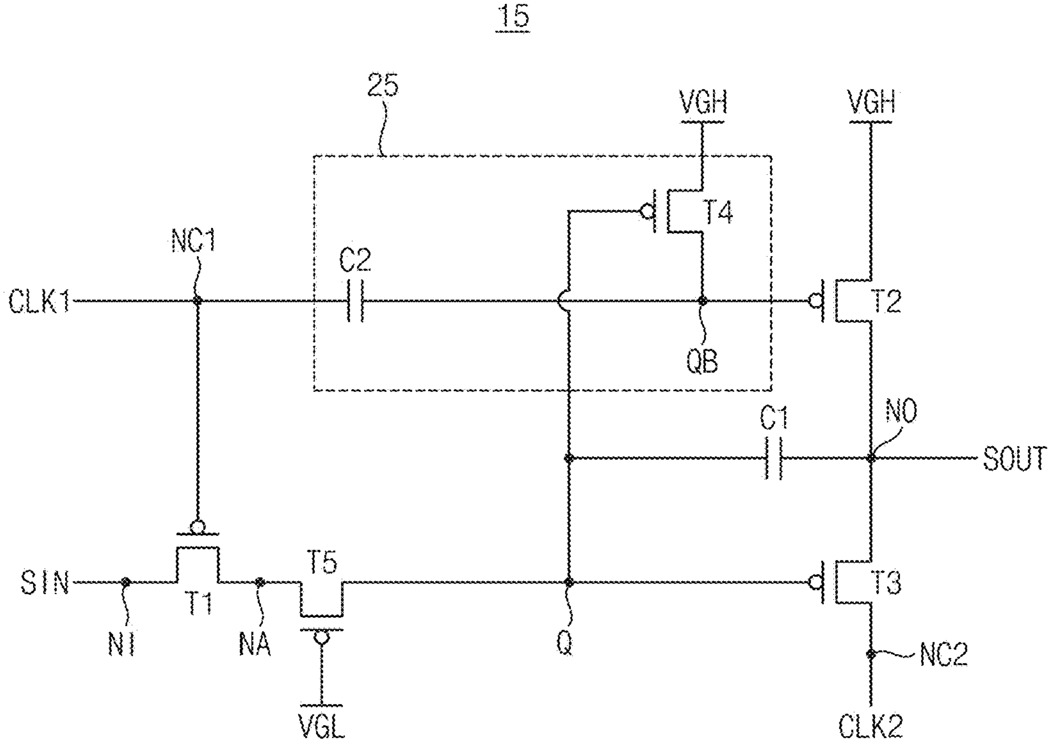
FIGS. 17, 18, 19 and 20 are circuit diagrams illustrating stage circuits according to example embodiments.
Figure 18:
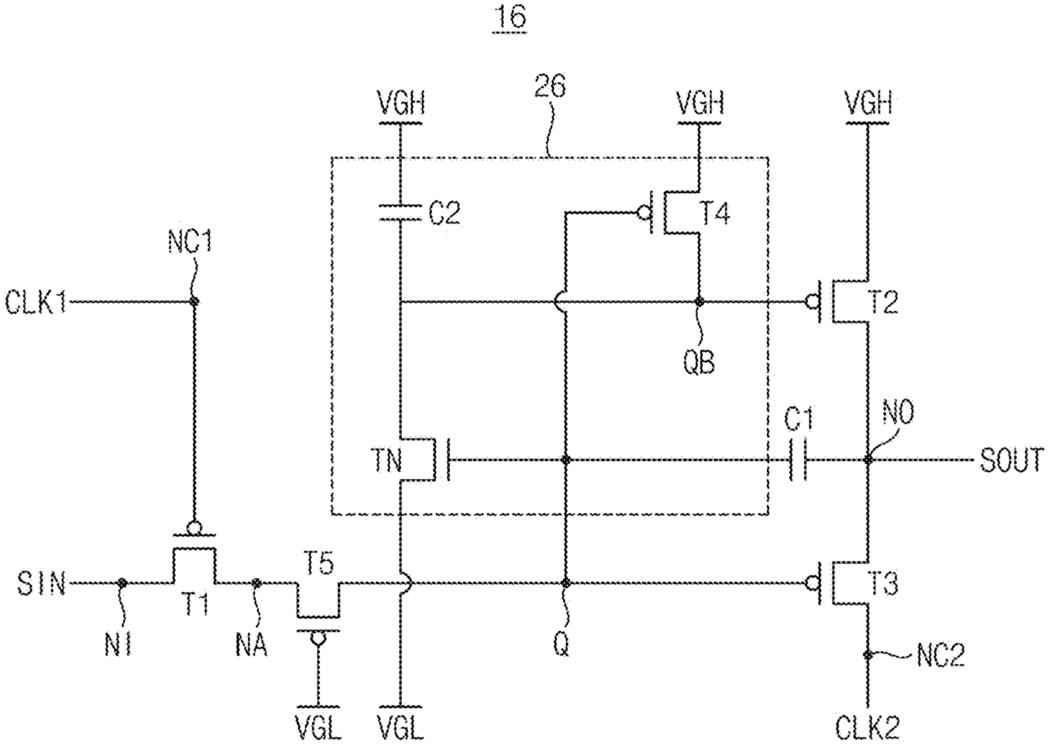
Figure 19:
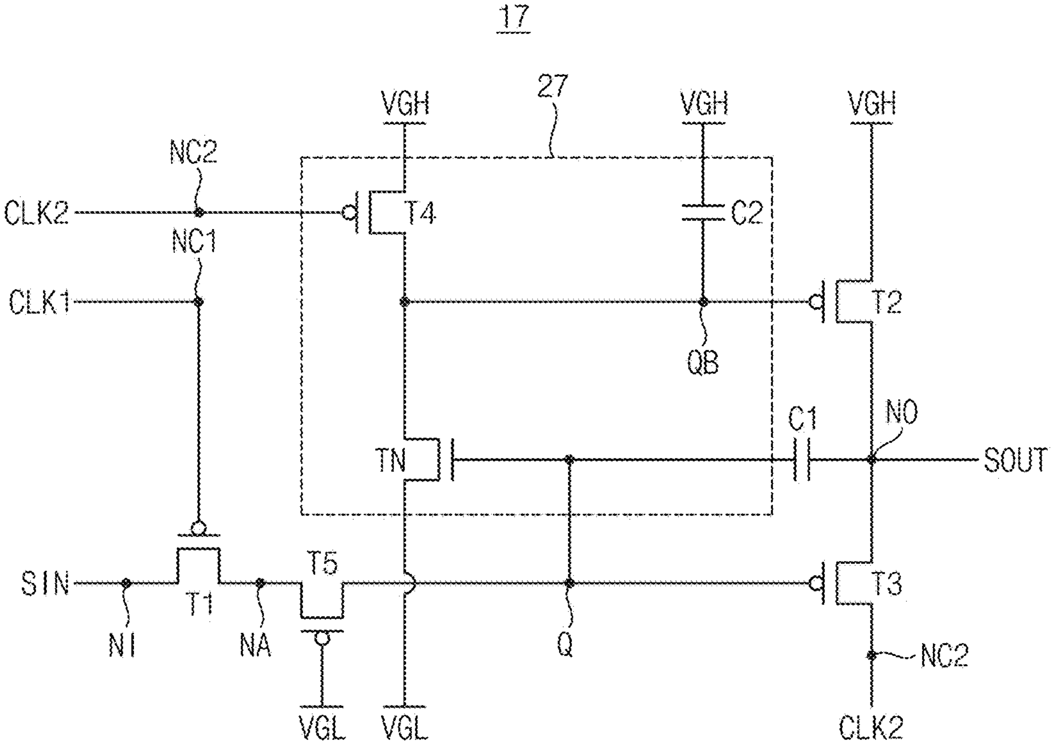
Figure 20:
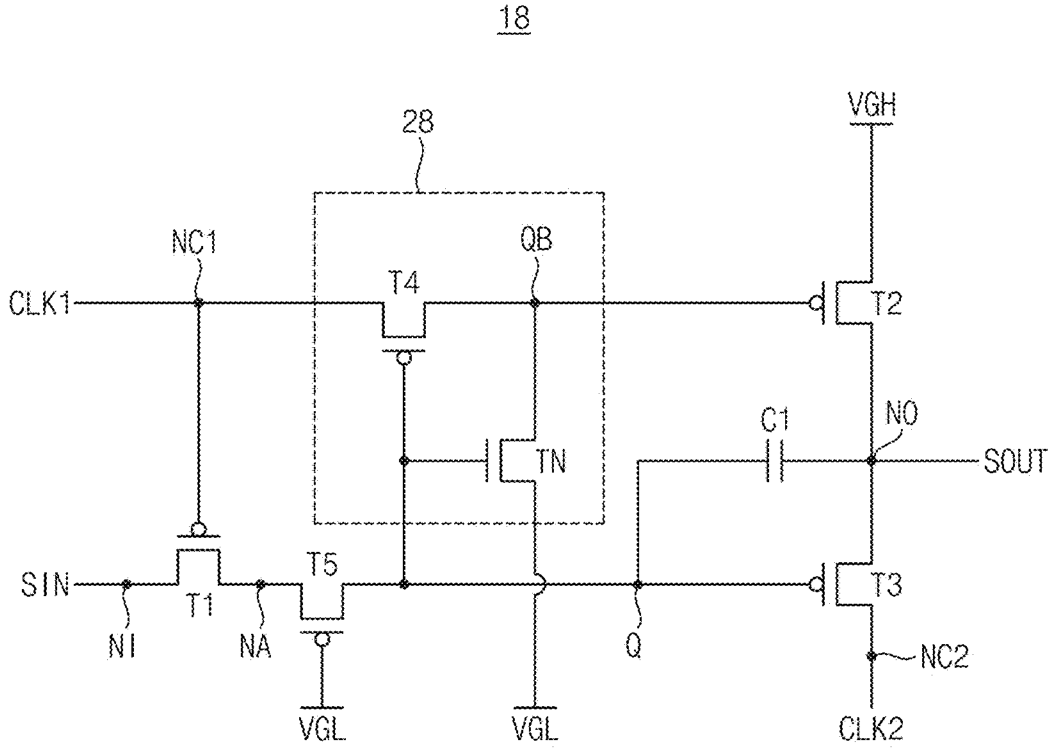

Except for further inclusion of a load reduction transistor T5, a stage circuit 15 of FIG. 17 is substantially the same as the stage circuit 11 of FIG. 8, a stage circuit 16 of FIG. 18 is substantially the same as the stage circuit 12 of FIG. 11, a stage circuit 17 of FIG. 19 is substantially the same as the stage circuit 13 of FIG. 13, and a stage circuit 18 of FIG. 20 is substantially the same as the stage circuit 14 of FIG. 15, and the redundant description may be omitted.

The load reduction transistor T5 may be connected between an intermediate terminal NA and the control terminal Q. In other words, the load reduction transistor T5 may be connected in series with the first transistor T1 between the input terminal NI and the control terminal Q.

The gate low voltage VGL may be applied to the gate electrode of the load reduction transistor T5. Thus, the load reduction transistor T5 may always be turned on during operation of the stage circuit.

As described above, in the third operation interval P3, the control voltage VQ of the control terminal Q drops to a further lower level. In this case, the source-drain voltage of the first transistor T1 increases further, which may promote degradation of the first transistor T1 or cause breakdown. By adding the load reduction transistor T5, the load on the first transistor T1 may be distributed to reduce the degradation of the first transistor T1 and prevent breakdown.

Figure 21:
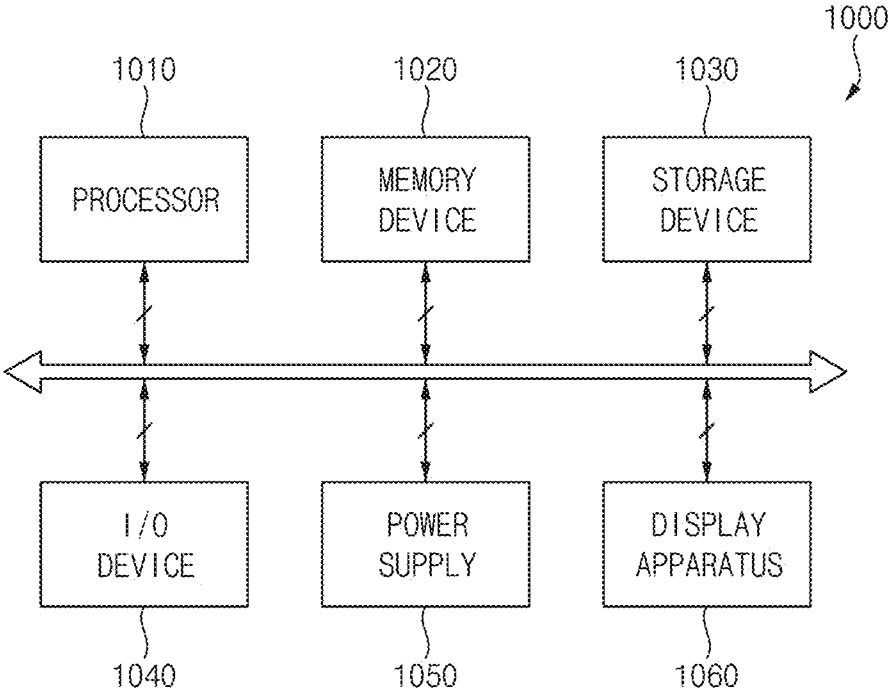
FIG. 21 is a block diagram illustrating an electronic device according to example embodiments.
Figure 22:
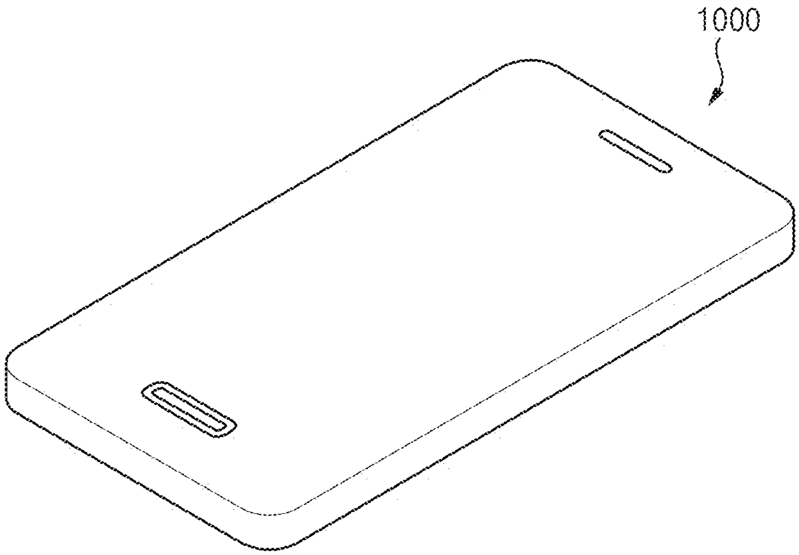
FIG. 22 is a diagram illustrating an example of the electronic device of FIG. 21 implemented as a smartphone.

FIG. 21 is a block diagram illustrating an electronic device according to example embodiments, and FIG. 22 is a diagram illustrating an example of the electronic device of FIG. 21 implemented as a smartphone.

Referring to FIGS. 1 through 22, an electronic device 1000 may include a processor 1010, a memory device 1020, a storage device 1030, an input/output device 1040, a power supply 1050, and a display device 1060. The display device 1060 may correspond to the display device of FIG. 3. In addition, the electronic device 1000 may further include multiple ports for communicating with a video card, sound card, memory card, USB device, or the like, or for communicating with other systems.

According to example embodiments, the electronic device 1000 may be implemented as a smartphone, as shown in FIG. 22, but the electronic device 1000 is not limited thereto. For example, the electronic device 1000 may be implemented as a cell phone, videophone, smart pad, smartwatch, tablet PC, in-vehicle navigation, computer monitor, a laptop computer, a head-mounted display device, or the like.

The processor 1010 may perform certain calculations or tasks. The processor 1010 may be a microprocessor, a central processing unit, an application processor, or the like. The processor 1010 may be connected to other components via an address bus, a control bus, a data bus, and the like. Depending on the example embodiment, the processor 1010 may also be connected to an expansion bus, such as a Peripheral Component Interconnect ("PCI") bus.

The processor 1010 may output the input image data IMG and the input control signal CONT to the drive controller 200 of FIG. 3.

The memory device 1020 may store data necessary for operation of the electronic device 1000. Nano Floating Gate Memory ("NFGM") devices, Polymer Random Access Memory ("PoRAM") devices, Magnetic Random Access Memory ("MRAM") devices, Ferroelectric Random Access Memory ("FRAM") devices, and/or non-volatile memory devices such as Dynamic Random Access Memory ("DRAM") devices, Static Random Access Memory ("SRAM") devices, Mobile DRAM devices, and the like.

The storage device 1030 may include a solid state drive ("SSD"), a hard disk drive ("HDD"), a CD-ROM, or the like. Input/output devices 1040 may include input means such as a keyboard, keypad, touchpad, touchscreen, mouse, etc. and output means such as speakers, printers, etc.

According to example embodiments, the display device 1060 may be included in the I/O device 1040. The power supply 1050 may provide power for operation of the electronic device 1000. The display device 1060 may be connected to other components via the above buses or other communication links.

The display device 1060 may include stage circuit according to example embodiments as described above.

As described above, the stage circuit according to example embodiments may be implemented with fewer transistors, thereby reducing the size of the gate driver including the stage circuits and reducing the dead space in the display panel without sacrificing performance of the gate driver. In addition, the stage circuit according to example embodiments may utilize boosting via capacitors to improve the waveform of the output signal, thereby enhancing the performance of the display device including the stage circuits. Further, the stage circuit according to example embodiments may remove unnecessary operation of the display device and reduce wiring routing in the display device by using fewer transistors and capacitors, thereby improving the design margin of the display device.

Example embodiments may be applied to a display device and any electronic devices and systems including a display device. For example, the example embodiments may be applied to systems such as a mobile phone, a smart phone, a personal digital assistant ("PDA"), a portable multimedia player ("PMP"), a digital camera, a camcorder, a personal computer ("PC"), a server computer, a workstation, a laptop computer, a digital TV, a set-top box, a portable game console, a navigation system, a wearable device, an internet of things ("IoT") device, an internet of everything ("IoE") device, an e-book, a virtual reality ("VR") device, an augmented reality ("AR") device, a server system, an automotive driving system, etc.

The foregoing is illustrative of example embodiments and is not to be construed as limiting thereof. Although a few example embodiments have been described, those skilled in the art will readily appreciate that many modifications are possible in the example embodiments without materially departing from the example embodiments.

What is claimed is:

1. A stage circuit included in a gate driver of a display device, comprising:

a first transistor connected between an input terminal receiving an input signal and a control terminal, the first transistor including a gate electrode connected to a first clock terminal receiving a first clock signal:

a second transistor connected between a line supplying a gate high voltage and an output terminal generating an output signal, the second transistor including a gate electrode connected to an inversion control terminal;

a third transistor connected between the output terminal and a second clock terminal receiving a second clock signal, the third transistor including a gate electrode connected to the control terminal;

a first capacitor connected between the control terminal and the output terminal; and a control circuit configured to control an inversion control voltage of the inversion control terminal based on a control voltage of the control terminal, wherein, in a first operation period, the first clock signal and the input signal are at a logic low level, the second clock signal is at a logic high level, and the control voltage is at the logic low level, wherein, in a second operation period after the first operation period, the first clock signal, the second clock signal and the input signal are at the logic high level, and the control voltage maintains the logic low level, wherein, in a third operation period after the second operation period, the second clock signal is at the logic low level, the first clock signal and the input signal are at the logic high level, and the control voltage is boosted to a boosting level lower than the logic low level, wherein, in a fourth operation period after the third operation period, the first clock signal, the second clock signal and the input signal are at the logic high level, and the control voltage is restored to the logic low level from the boosting level, and wherein, in a fifth operation period after the fourth operation period, the first clock signal is at the logic low level, the input signal and the second clock signal are at the logic high level, and the control voltage is at the logic high level.

2. The stage circuit of claim 1, wherein the first clock signal and the second clock signal have a same clock cycle, have a phase difference of 180 degrees from each other, and are each at a logic low level for ¼ of the clock cycle, and, wherein a horizontal time allocated to drive one row of the display device is ½ of the clock cycle.

3. The stage circuit of claim 1, wherein the first transistor, the second transistor, and the third transistor are P-type metal oxide semiconductor (PMOS) transistors.

4. The stage circuit of claim 1, wherein the output signal is at the logic low level in the third operation period, and the output signal is at the logic high level in the first operation period, the second operation period, the fourth operation period and the fifth operation period.

5. The stage circuit of claim 1, wherein the inversion control voltage is at the logic low level in the fifth operation period, and the inversion control voltage is at the logic high level in the first operation period, the second operation period, the third operation period and the fourth operation period.

6. The stage circuit of claim 1, wherein the control circuit includes:

a fourth transistor connected between the line supplying the gate high voltage and the inversion control terminal, the fourth transistor including a gate electrode connected to the control terminal; and a second capacitor connected between the first clock terminal and the inversion control terminal.

7. The stage circuit of claim 6, wherein the first transistor, the second transistor, the third transistor and the fourth transistor are PMOS transistors.

8. The stage circuit of claim 1, wherein the control circuit includes:

a fourth transistor connected between the line supplying the gate high voltage and the inversion control terminal, the fourth transistor including a gate electrode connected to the second clock terminal;

an enhancement transistor connected between a line supplying a gate low voltage and the inversion control terminal, the enhancement transistor including a gate electrode connected to the control terminal; and a second capacitor connected between the line supplying the gate high voltage and the inversion control terminal.

9. The stage circuit of claim 8, wherein the first transistor, the second transistor, the third transistor and the fourth transistor are PMOS transistors, and the enhancement transistor is an NMOS transistor.

10. The stage circuit of claim 1, wherein the control circuit includes:

a fourth transistor connected between the first clock terminal and the inversion control terminal, the fourth transistor including a gate electrode connected to the control terminal; and an enhancement transistor connected between a line supplying a gate low volta and the inversion control terminal, the enhancement transistor including a gate electrod connected to the control terminal.

11. The stage circuit of claim 10, wherein the first transistor, the second transistor, the third transistor and the fourth transistor are PMOS transistors, and the enhancement transistor is an NMOS transistor.

12. The stage circuit of claim 1, further comprising:

a load-reduction transistor connected in series with the first transistor between the input terminal and the control terminal, the load-reduction transistor including a gat electrode receiving a gate low voltage.

13. The stage circuit of claim 1, wherein the control circuit includes one transistor and one capacitor.

14. The stage circuit of claim 1, wherein the control circuit includes two transistors.

15. A stage circuit included in a gate driver of a display device, comprising:

a first transistor connected between an input terminal receiving an input signal and a control terminal, the first transistor including a gate electrode connected to a first clock terminal receiving a first clock signal:

a second transistor connected between a line supplying a gate high voltage and an output terminal generating an output signal, the second transistor including a gate electrode connected to an inversion control terminal;

a third transistor connected between the output terminal and a second clock terminal receiving a second clock signal, the third transistor including a gate electrode connected to the control terminal;

a first capacitor connected between the control terminal and the output terminal; and a control circuit configured to control an inversion control voltage of the inversion control terminal based on a control voltage of the control terminal, wherein the control circuit includes:

a fourth transistor connected between the line supplying the gate high voltage and the inversion control terminal, the fourth transistor including a gate electrode connected to the control terminal;

an enhancement transistor connected between a line supplying a gate low voltage and the inversion control terminal, the enhancement transistor including a gate electrode connected to the control terminal; and a second capacitor connected between the line supplying the gate high voltage and the inversion control terminal.

16. The stage circuit of claim 15, wherein the first transistor, the second transistor, the third transistor and the fourth transistor are PMOS transistors, and the enhancement transistor is an N-type metal oxide semiconductor (NMOS) transistor.

17. A display device comprising a display panel including a pixel;

a gate driver configured to output a gate signal to the pixel;

a data driver configured to output a data voltage to the pixel; and an emission driver configured to output an emission signal to the pixel, wherein the gate driver includes at least one stage circuit, and wherein the stage circuit includes:

a first transistor connected between an input terminal receiving an input signal and a control terminal, the first transistor including a gate electrode connected to a first clock terminal receiving a first clock signal:

a second transistor connected between a line supplying a gate high voltage and an output terminal generating an output signal, the second transistor including a gate electrode connected to an inversion control terminal;

a third transistor connected between the output terminal and a second clock terminal receiving a second clock signal, the third transistor including a gate electrode connected to the control terminal;

a first capacitor connected between the control terminal and the output terminal; and a control circuit configured to control an inversion control voltage of the inversion control terminal based on a control voltage of the control terminal, wherein, in a first operation period, the first clock signal and the input signal are at a logic low level, the second clock signal is at a logic high level, and the control voltage is at the logic low level, wherein, in a second operation period after the first operation period, the first clock signal, the second clock signal and the input signal are at the logic high level, and the control voltage maintains the logic low level, wherein, in a third operation period after the second operation period, the second clock signal is at the logic low level, the first clock signal and the input signal are at the logic high level, and the control voltage is boosted to a boosting level lower than the logic low level, wherein, in a fourth operation period after the third operation period, the first clock signal, the second clock signal and the input signal are at the logic high level, and the control voltage is restored to the logic low level from the boosting level, and wherein, in a fifth operation period after the fourth operation period, the first clock signal is at the logic low level, the input signal and the second clock signal are at the logic high level, and the control voltage is at the logic high level.

* * * * *